US008585490B2

(12) United States Patent
Amaitis et al.

(10) Patent No.: US 8,585,490 B2
(45) Date of Patent: *Nov. 19, 2013

(54) COMPUTER GRAPHICS PROCESSING METHODS AND SYSTEMS FOR PRESENTATION OF GRAPHIC OBJECTS

(75) Inventors: Lee Amaitis, Las Vegas, NV (US); David Anthony Puckeridge, London (GB); Christopher John Davie, London (GB); Guy Iain Oliver, London (GB); Peter Kenneth Lawrey, Surrey (GB)

(73) Assignee: Cantor Index, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,977

(22) Filed: Sep. 14, 2012

(65) Prior Publication Data

US 2013/0130783 A1 May 23, 2013

Related U.S. Application Data

(63) Continuation of application No. 11/536,059, filed on Sep. 28, 2006, now Pat. No. 8,342,942, which is a continuation of application No. 11/467,047, filed on Aug. 24, 2006, now Pat. No. 8,128,474, which is a continuation-in-part of application No. 10/794,666, filed on Mar. 5, 2004, now abandoned.

(51) Int. Cl.
 *A63F 9/24* (2006.01)
(52) U.S. Cl.
 USPC .............................................. 463/25; 463/42
(58) Field of Classification Search
 USPC ..................................................... 463/25, 42
 See application file for complete search history.

(56) References Cited

U.S. PATENT DOCUMENTS 3,810,627 A   5/1974 Levy
4,569,526 A   2/1986 Hamilton
(Continued)

FOREIGN PATENT DOCUMENTS

AU   2004227808   1/2004
EP   1 139 245 A   3/2000
(Continued)

OTHER PUBLICATIONS

The Patent Office Search Report from International Application No. GB 0320232.2, 6 pages, Dec. 17, 2003.

(Continued)

*Primary Examiner* — Corbett B Coburn
(74) *Attorney, Agent, or Firm* — Thomas D. Bradshaw

(57) ABSTRACT

Computer graphics processing systems and methods are provided for the presentation of graphic objects or text in a wagering environment. In at least one embodiment, the systems and methods present graphic objects on a graphic user interface screen that includes at least one of a plurality of betting lines, including a reference betting line, such as a market betting line having a value that corresponds to a value of a reference variable associated with an object, a high line having a value corresponding to an amount above the reference variable value, a low line having a value corresponding to an amount below the reference variable value, etc. The market, high, and low lines may be arranged spatially on the interface screen based at least on the values of each of the lines. The interface screen includes a least one computer generated graphic object associated with each of the betting lines that is selectable for submitting at least one of an up bet request and a down bet request. The at least one graphic object may be rotating or moving based on the tradeable state associated with the graphic object.

20 Claims, 12 Drawing Sheets

(56) References Cited

U.S. PATENT DOCUMENTS

| | | |
|---|---|---|
| 4,666,160 A | 5/1987 | Hamilton |
| 4,695,053 A | 9/1987 | Vazquez, Jr. et al. |
| 4,856,788 A | 8/1989 | Fischel |
| 4,874,177 A | 10/1989 | Girardin |
| 4,875,164 A | 10/1989 | Monfort |
| 4,962,950 A | 10/1990 | Champion |
| 5,249,800 A | 10/1993 | Hilgendorf et al. |
| 5,524,888 A | 6/1996 | Heidel |
| 5,573,244 A | 11/1996 | Mindes |
| 5,575,474 A | 11/1996 | Rossides |
| 5,586,937 A | 12/1996 | Menashe |
| 5,588,650 A | 12/1996 | Eman et al. |
| 5,695,402 A | 12/1997 | Stupak |
| 5,713,793 A | 2/1998 | Holte |
| 5,743,525 A | 4/1998 | Haddad |
| 5,749,785 A | 5/1998 | Rossides |
| 5,762,552 A | 6/1998 | Vuong et al. |
| 5,842,921 A | 12/1998 | Mindes et al. |
| 5,851,010 A | 12/1998 | Feinberg |
| 5,873,782 A | 2/1999 | Hall |
| 5,888,136 A | 3/1999 | Herbert |
| 6,024,641 A | 2/2000 | Sarno |
| 6,026,383 A | 2/2000 | Ausubel |
| 6,038,554 A | 3/2000 | Vig |
| 6,078,904 A | 6/2000 | Rebane |
| 6,110,042 A | 8/2000 | Walker et al. |
| 6,113,492 A | 9/2000 | Walker et al. |
| 6,126,543 A | 10/2000 | Friedman |
| 6,152,822 A | 11/2000 | Herbert |
| 6,157,918 A | 12/2000 | Shepherd |
| 6,296,569 B1 | 10/2001 | Congello, Jr. |
| 6,309,307 B1 | 10/2001 | Krause et al. |
| 6,321,212 B1 | 11/2001 | Lange |
| 6,325,721 B1 | 12/2001 | Miyamoto et al. |
| 6,331,148 B1 | 12/2001 | Krause et al. |
| 6,343,988 B1 | 2/2002 | Walker et al. |
| 6,358,150 B1 | 3/2002 | Mir et al. |
| 6,394,899 B1 | 5/2002 | Walker |
| 6,421,653 B1 | 7/2002 | May |
| 6,450,887 B1 | 9/2002 | Mir et al. |
| 6,527,270 B2 | 3/2003 | Maksymec et al. |
| 6,558,255 B2 | 5/2003 | Walker et al. |
| 6,612,927 B1 | 9/2003 | Siomiany et al. |
| 6,616,529 B1 | 9/2003 | Qian et al. |
| 6,709,330 B1 | 3/2004 | Klein et al. |
| 6,869,360 B2 | 3/2005 | Marks et al. |
| 6,890,255 B2 | 5/2005 | Jarvis et al. |
| 6,929,264 B2 | 8/2005 | Huard et al. |
| 6,938,900 B2 | 9/2005 | Snow |
| 7,018,293 B2 | 3/2006 | Brown et al. |
| 7,040,982 B1 | 5/2006 | Jarvis et al. |
| 7,066,813 B1 | 6/2006 | Sakamoto et al. |
| 7,160,189 B2 | 1/2007 | Walker et al. |
| 7,206,762 B2 | 4/2007 | Sireau |
| 7,236,953 B1 | 6/2007 | Cooper et al. |
| 7,246,093 B1 | 7/2007 | Katz |
| 7,299,208 B1 | 11/2007 | Bailon et al. |
| 7,302,412 B1 | 11/2007 | Speck |
| 7,315,838 B2 | 1/2008 | Gershon |
| 7,349,877 B2 | 3/2008 | Ballow et al. |
| 7,395,232 B1 | 7/2008 | Pilato |
| 7,401,046 B2 | 7/2008 | Hollerman et al. |
| 7,409,367 B2 | 8/2008 | McGill et al. |
| 7,496,534 B2 | 2/2009 | Olsen et al. |
| 7,559,838 B2 | 7/2009 | Walker et al. |
| 7,566,270 B2 | 7/2009 | Amaitis et al. |
| 7,587,347 B2 | 9/2009 | Griffin et al. |
| 7,604,537 B2 | 10/2009 | Amaitis et al. |
| 7,641,549 B2 | 1/2010 | Asher et al. |
| 7,693,781 B2 | 4/2010 | Asher et al. |
| 7,711,628 B2 | 5/2010 | Davie et al. |
| 7,835,961 B2 | 11/2010 | Davie et al. |
| 7,937,318 B2 | 5/2011 | Davie et al. |
| 7,962,400 B2 | 6/2011 | Amaitis et al. |
| 8,046,293 B2 | 10/2011 | Sireau |
| 8,086,510 B2 | 12/2011 | Amaitis et al. |
| 8,128,474 B2 | 3/2012 | Amaitis et al. |
| 8,142,283 B2 | 3/2012 | Lutnick et al. |
| 8,147,313 B2 | 4/2012 | Amaitis et al. |
| 8,208,808 B2 | 6/2012 | Bernstein et al. |
| 2001/0032169 A1 | 10/2001 | Sireau |
| 2001/0039209 A1 | 11/2001 | DeWeese et al. |
| 2001/0047291 A1 | 11/2001 | Garahi et al. |
| 2002/0032644 A1 | 3/2002 | Corby et al. |
| 2002/0055381 A1 | 5/2002 | Tarantino |
| 2002/0068633 A1 | 6/2002 | Schlaifer |
| 2002/0069161 A1 | 6/2002 | Eckert et al. |
| 2002/0072978 A1 | 6/2002 | Odom et al. |
| 2002/0073021 A1 | 6/2002 | Ginsberg et al. |
| 2002/0077952 A1 | 6/2002 | Eckert et al. |
| 2002/0077961 A1 | 6/2002 | Eckert et al. |
| 2002/0087447 A1 | 7/2002 | McDonald et al. |
| 2002/0090988 A1 | 7/2002 | Frost et al. |
| 2002/0098883 A1 | 7/2002 | Packes et al. |
| 2002/0115488 A1 | 8/2002 | Berry et al. |
| 2002/0147047 A1 | 10/2002 | Letovsky et al. |
| 2002/0151358 A1 | 10/2002 | Walker et al. |
| 2002/0151363 A1 | 10/2002 | Letovsky et al. |
| 2002/0198044 A1 | 12/2002 | Walker et al. |
| 2003/0018571 A1 | 1/2003 | Eckert et al. |
| 2003/0046218 A1 | 3/2003 | Albanese et al. |
| 2003/0054875 A1 | 3/2003 | Marks et al. |
| 2003/0075869 A1 | 4/2003 | Breeding et al. |
| 2003/0092489 A1 | 5/2003 | Veradej |
| 2003/0096651 A1 | 5/2003 | Black |
| 2003/0109300 A1 | 6/2003 | Walker et al. |
| 2003/0137110 A1 | 7/2003 | Huard et al. |
| 2003/0162594 A1 | 8/2003 | Rowe |
| 2003/0181234 A1 | 9/2003 | Falciglia |
| 2003/0195841 A1 | 10/2003 | Ginsberg et al. |
| 2003/0216170 A1 | 11/2003 | Walker et al. |
| 2003/0218303 A1 | 11/2003 | Walker et al. |
| 2003/0220134 A1 | 11/2003 | Walker et al. |
| 2004/0077398 A1 | 4/2004 | Jarvis et al. |
| 2004/0087357 A1 | 5/2004 | Johnson |
| 2004/0090005 A1 | 5/2004 | Snow |
| 2004/0111358 A1 | 6/2004 | Lange et al. |
| 2004/0117292 A1 | 6/2004 | Brumfield et al. |
| 2004/0166918 A1 | 8/2004 | Walker et al. |
| 2004/0176159 A1 | 9/2004 | Walker et al. |
| 2004/0176994 A1 | 9/2004 | Fine et al. |
| 2004/0193469 A1 | 9/2004 | Amaitis et al. |
| 2004/0193531 A1 | 9/2004 | Amaitis et al. |
| 2004/0198487 A1 | 10/2004 | Schneider |
| 2004/0204229 A1 | 10/2004 | Walker et al. |
| 2004/0204232 A1 | 10/2004 | Asher et al. |
| 2004/0210507 A1 | 10/2004 | Asher et al. |
| 2004/0214629 A1 | 10/2004 | Walker et al. |
| 2004/0224770 A1 | 11/2004 | Wolf et al. |
| 2004/0248637 A1 | 12/2004 | Liebenberg et al. |
| 2005/0043078 A1 | 2/2005 | Sundstrom |
| 2005/0059467 A1 | 3/2005 | Saffari et al. |
| 2005/0091134 A1 | 4/2005 | Rossides |
| 2005/0102223 A1 | 5/2005 | Vlazny et al. |
| 2005/0119962 A1 | 6/2005 | Bowen et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0208996 A1 | 9/2005 | Friedman |
| 2005/0245308 A1 | 11/2005 | Amaitis et al. |
| 2005/0245310 A1 | 11/2005 | Amaitis et al. |
| 2006/0084495 A1 | 4/2006 | Jaffe et al. |
| 2006/0105839 A1 | 5/2006 | Graeve et al. |
| 2006/0105840 A1 | 5/2006 | Graeve |
| 2006/0199631 A1 | 9/2006 | McGill et al. |
| 2006/0205485 A1 | 9/2006 | Walker et al. |
| 2006/0205486 A1 | 9/2006 | Walker et al. |
| 2006/0258429 A1 | 11/2006 | Manning et al. |
| 2006/0287072 A1 | 12/2006 | Walker et al. |
| 2007/0083457 A1 | 4/2007 | Evelyn et al. |
| 2007/0088661 A1 | 4/2007 | De Verdier et al. |
| 2007/0111777 A1 | 5/2007 | Amaitis et al. |
| 2007/0117624 A1 | 5/2007 | Amaitis et al. |
| 2007/0120320 A1 | 5/2007 | Miltenberger et al. |

(56) References Cited

U.S. PATENT DOCUMENTS

| | | | |
|---|---|---|---|
| 2007/0123336 A1 | 5/2007 | Amaitis et al. |
| 2007/0129138 A1 | 6/2007 | Amaitis et al. |
| 2007/0207849 A1 | 9/2007 | Asher et al. |
| 2007/0288348 A1 | 12/2007 | Sireau |
| 2008/0032778 A1 | 2/2008 | Amaitis et al. |
| 2008/0039189 A1 | 2/2008 | Walker et al. |
| 2008/0051171 A1 | 2/2008 | Lutnick et al. |
| 2008/0200242 A1 | 8/2008 | Ginsberg et al. |
| 2008/0275824 A1 | 11/2008 | Assia et al. |
| 2009/0062016 A1 | 3/2009 | Assia et al. |
| 2009/0163265 A1 | 6/2009 | Amaitis et al. |
| 2009/0163266 A1 | 6/2009 | Amaitis et al. |
| 2009/0209312 A1 | 8/2009 | Alderucci et al. |
| 2009/0209321 A1 | 8/2009 | Alderucci et al. |
| 2010/0009743 A1 | 1/2010 | Amaitis et al. |
| 2010/0048302 A1 | 2/2010 | Lutnick et al. |
| 2010/0124967 A1 | 5/2010 | Lutnick et al. |
| 2010/0173698 A1 | 7/2010 | Davie et al. |
| 2011/0065490 A1 | 3/2011 | Lutnick et al. |
| 2011/0066534 A1 | 3/2011 | Davie et al. |
| 2011/0130189 A1 | 6/2011 | Asher et al. |
| 2011/0256922 A1 | 10/2011 | Amaitis et al. |
| 2011/0275432 A1 | 11/2011 | Lutnick et al. |
| 2012/0066149 A1 | 3/2012 | Davie et al. |
| 2012/0231865 A1 | 9/2012 | Asher et al. |
| 2012/0231871 A1 | 9/2012 | Asher et al. |
| 2013/0005448 A1 | 1/2013 | Asher et al. |
| 2013/0012303 A1 | 1/2013 | Asher et al. |
| 2013/0102372 A1 | 4/2013 | Lutnick et al. |

FOREIGN PATENT DOCUMENTS

| | | |
|---|---|---|
| EP | 1 234606 | 8/2002 |
| GB | 1574447 | 9/1980 |
| GB | 2180675 A | 4/1987 |
| GB | 2299425 A | 10/1996 |
| JP | 9-511593 | 11/1997 |
| JP | 10-222726 | 8/1998 |
| JP | 10-277269 | 10/1998 |
| JP | 11-073576 | 3/1999 |
| JP | 11-347200 | 12/1999 |
| JP | 2000-000372 | 1/2000 |
| JP | 2000-024324 | 1/2000 |
| JP | 2001-523869 | 11/2001 |
| JP | 2002-23780 | 1/2002 |
| JP | 2002-41809 | 2/2002 |
| JP | 2002-085851 | 3/2002 |
| JP | 2003-505793 | 2/2003 |
| JP | 2003-062336 | 3/2003 |
| WO | WO 98/04991 | 2/1998 |
| WO | WO/99/26204 | 5/1999 |
| WO | WO 99/60498 | 11/1999 |
| WO | WO 00/79442 A1 | 12/2000 |
| WO | WO 01/55941 | 8/2001 |
| WO | WO 01/77964 A2 | 10/2001 |
| WO | WO 01-83058 | 11/2001 |
| WO | WO 01/86532 A | 11/2001 |
| WO | WO 03/093921 | 11/2003 |
| WO | WO 2004/079671 A2 | 9/2004 |
| WO | WO 2005/032675 | 4/2005 |
| WO | WO 2005/065065 | 7/2005 |
| WO | WO 2005/088509 | 9/2005 |

OTHER PUBLICATIONS

"Bet With the People Who Know Racing," Racing Daily Forum, 15 pages, Jul. 24, 2001.
"Quote of the Day; Bet of the Day," London Times, 1 page, Jul. 30, 2003.
TradeSports Trading & Betting Exchange, Best Lines & Bonuses, "What is Tradesports?," www.tradesports.com, 2 pages, Apr. 27, 2004.
PCT Notification of Transmittal of the International Search Report and the Written Opinion of the International Searching Authority, or the Declaration for International Application No. PCT/US05/46927, 9 pages, Jun. 19, 2006.
PCT Notification of Transmittal of the International Search Report and the Written Opinion of the International Searching Authority, or the Declaration for International Application No. PCT/US04/10028, Jun. 23, 2006, 6 pages.
Sauer, Raymond D.; "The Economics of Wagering Markets"; Journal of Economic Literature, vol. 36, No. 4; pp. 2021-2064, Dec. 1998.
Savage, Sam L.; "Prices, Probabilities and Predictions"; OR/MS Today; 10 pages, Jun. 2004.
USPTO Office Action for U.S. Appl. No. 11/018,978, Aug. 17, 2007 (12 pages).
Notification of Transmittal of the International Search Report and the Written Opinion of the International Searching Authority for International Application No. PCT/US05/15001; 10 pages, Sep. 13, 2007.
Australian Examiner's Report for Application 2004227808; 2 pages; May 16, 2008.
Notification of Transmittal of the International Search Report and the Written Opinion of the International Searching Authority for International Application No. PCT/US05/15129; 8 pages, May 28, 2008.
Welcome to binarybet.com; binarybet.com; 1 page; Date: 2003.
What is a Binary Bet?; binarybet.com; 1 page; Date: 2003.
Frequently Asked Questions; binarybet.com; 1 page; Date: 2003.
Fixed Odds Financial Betting; http://web.archive.org/web/20020329110541Ihttp://betonmarkets.corn/; 2 pages; May 10, 2005.
Notification of Transmittal of the International Search Report and the Written Opinion of the International Searching Authority for International Application No. PCT/US2005/006853; 13 pages, May 10, 2005.
Finspreads—Aboutfinancial spread betting, Wayback Machine, Dec. 24, 2008, pp. 1-12 ("Finspreads").
Tulloch, Freddie, "Financial Spread Betting," Derivatives Use, Trading, & Regulations, London: 2003, vol. 9, Iss. 1, p. 28, 5 pgs.
"There was time when financial spread betting was just a way to "punt" on the financial markets, purely a gambling product with wide spreads and odds firmly in the bookmaker's favour," Sunday Business, London (UK), Nov. 30, 2003, p. 1.
USPTO Office Action for U.S. Appl. No. 10/654,280, Apr. 7, 2005 (9 pages).
USPTO Office Action for U.S. Appl. No. 10/654,280, Jul. 13, 2005 (11 pages).
USPTO Office Action for U.S. Appl. No. 10/654,280, Jan. 12, 2006 (10 pages).
USPTO Office Action for U.S. Appl. No. 10/836,999, Mar. 18, 2008 (9 pages).
USPTO Office Action for U.S. Appl. No. 10/836,999, Jan. 9, 2009 (5 pages).
USPTO Office Action for U.S. Appl. No. 11/745,573, Apr. 10, 2008 (8 pages).
USPTO Office Action for U.S. Appl. No. 11/745,573, Jan. 9, 2009 (6 pages).
USPTO Office Action for U.S. Appl. No. 10/794,668, May 28, 2008 (6 pages).
USPTO Office Action for U.S. Appl. No. 10/794,668, Oct. 6, 2008 (9 pages).
USPTO Office Action for U.S. Appl. No. 10/794,666, Sep. 27, 2007 (6 pages).
USPTO Office Action for U.S. Appl. No. 10/794,666, May 28, 2008 (10 pages).
USPTO Office Action for U.S. Appl. No. 10/795,163, Mar. 13, 2008 (10 pages).
USPTO Office Action for U.S. Appl. No. 10/795,163, Nov. 25, 2008 (14 pages).
USPTO Office Action for U.S. Appl. No. 11/535,662, Nov. 1, 2007 (11 pages).
USPTO Office Action for U.S. Appl. No. 11/535,662, Aug. 21, 2008 (12 pages).
USPTO Office Action for U.S. Appl. No. 11/535,662, Dec. 22, 2008 (12 pages).
USPTO Office Action for U.S. Appl. No. 11/536,094, Oct. 25, 2007 (23 pages).
USPTO Office Action for U.S. Appl. No. 11/536,094, Jul. 22, 2008 (15 pages).

(56) References Cited

OTHER PUBLICATIONS

USPTO Office Action for U.S. Appl. No. 10/836,077, Jun. 28, 2007 (5 pages).
USPTO Office Action for U.S. Appl. No. 11/018,978, Jul. 12, 2007 (3 pages).
USPTO Office Action for U.S. Appl. No. 11/018,978, May 14, 2008 (6 pages).
USPTO Office Action for U.S. Appl. No. 10/836,077, Jun. 3, 2008 (2 pages).
USPTO Office Action for U.S. Appl. No. 11/018,978, May 18, 2006 (14 pages).
USPTO Office Action for U.S. Appl. No. 11/018,978, Apr. 25, 2007 (15 pages).
USPTO Office Action for U.S. Appl. No. 10/836,077, Aug. 22, 2007 (17 pages).
USPTO Office Action for U.S. Appl. No. 10/836,077, Mar. 14, 2008 (11 pages).
USPTO Office Action for U.S. Appl. No. 11/745,646, Jun. 25, 2009 (10 pages).
USPTO Office Action for U.S. Appl. No. 11/745,573, Jul. 22, 2009 (10 pages).
USPTO Office Action for U.S. Appl. No. 10/794,666, May 21, 2009 (13 pages).
USPTO Office Action for U.S. Appl. No. 10/794,668, Sep. 15, 2009 (16 pages).
USPTO Office Action for U.S. Appl. No. 10/836,999, Oct. 16, 2009 (10 pages).
USPTO Examiner Interview Summary for U.S. Appl. No. 10/654,280, Aug. 7, 2006 (3 pages).
USPTO Notice of Allowance and Fees Due for U.S. Appl. No. 10/654,280, Jan. 25, 2007 (9 pages).
USPTO Notice of Allowance and Fees Due for U.S. Appl. No. 10/654,280, Mar. 12, 2007 (6 pages).
USPTO Notice of Allowance and Fees Due for U.S. Appl. No. 10/654,280, Mar. 20, 2007 (6 pages).
USPTO Notice of Allowance and Fees Due for U.S. Appl. No. 11/745,573, Nov. 18, 2009 (6 pages).
USPTO Notice of Allowance and Fees Due for U.S. Appl. No. 10/795,163, Dec. 18, 2009 (8 pages).
Trading Places: Even in difficult Financial times there are still ways for the on-line investor to make money. Niki Chesworth, Evening Standard p. 68, Nov. 26, 2001.
Online Spread Betting: A Risky Business, Peter Temple, FT EPAT May 1, 2002.
Australian Examiner's Report for Application 2005220915, dated Dec. 10, 2009 (2 pages).
Australian Examiner's Report for Application 2005241468 dated Jan. 12, 2010 (3 pages).
Australian Examiner's Report for Application 2005226038 dated Jan. 8, 2010 (2 pages).
Australian Examiner's Report for Application 2005220917, dated Jan. 8, 2010 (2 pages).
USPTO Office Action for U.S. Appl. No. 11/536,059, Feb. 5, 2010 (11 pages).
USPTO Examiner's Answer to Appeal Brief for U.S. Appl. No. 11/536,094, Oct. 26, 2009 (18 pages).
USPTO Office Action for U.S. Appl. No. 11/745,646, Feb. 3, 2010 (5 pages).
USPTO Pre-Brief Appeal Conference Decision for U.S. Appl. No. 11/535,662, Aug. 6, 2009 (2 pages).
USPTO Pre-Brief Appeal Conference Decision for U.S. Appl. No. 11/535,662, Aug. 25, 2009 (3 pages).
USPTO Examiner's Answer to Appeal Brief for U.S. Appl. No. 11/535,662, Mar. 16, 2010 (12 pages).
USPTO Office Action for U.S. Appl. No. 11/467,047, Apr. 29, 2010 (6 pages).
USPTO Notice of Allowance and Fees Due for U.S. Appl. No. 10/836,999, May 10, 2010 (6 pages).
USPTO Pre-Brief Appeal Conference Decision for U.S. Appl. No. 10/794,668, May 13, 2010 (2 pages).
USPTO Office Action for U.S. Appl. No. 11/745,646, Aug. 5, 2010 (7 pages).
USPTO Notice of Allowance and Fees Due for U.S. Appl. No. 10/794,668, Jul. 7, 2010 (5 pages).
USPTO Notice of Allowance and Fees Due for U.S. Appl. No. 12/563,985, Jul. 6, 2010 (6 pages).
Australian Examiner's Report for Application 2007286823, dated Jun. 1, 2010 (4 pages).
Japanese Office Action with English translation for Application No. 2007-501964, dated Jul. 27, 2010 (7 pages).
Japanese Office Action with English translation for Application No. 2007-502051, dated Jul. 27, 2010 (7 pages).
Richard Dyson, "Spread Betting Lures British Investors in Game of Risk," Knight Ridder Tribute Business News, Mar. 31, 2002, p. 1 (2 pages).
U.S. Appl. No. 13/619,977, filed Sep. 14, 2012, Amaitis et al.
USPTO Supplemental Notice of Allowance and Fees Due for U.S. Appl. No. 10/794,668, Aug. 30, 2010 (2 pages).
USPTO Office Action for U.S. Appl. No. 11/467,047, Sep. 15, 2010 (6 pages).
USPTO Examiner Interview Summary for U.S. Appl. No. 11/745,646, Sep. 17, 2010 (2 pages).
Japanese Office Action with English translation for Application No. 2007-502044, dated Aug. 31, 2010 (6 pages).
USPTO Notice of Allowance and Fees Due for U.S. Appl. No. 10/836,999, Oct. 12, 2010 (6 pages).
International Preliminary Report on Patentability for International Application No. PCT/US05/46927, dated Jun. 26, 2007 (7 pages).
International Preliminary Report on Patentability for International Application No. PCT/US04/10028, dated Aug. 22, 2006 (4 pages).
International Preliminary Report on Patentability for International Application No. PCT/US04/10028, dated Oct. 18, 2006 (4 pages).
International Preliminary Report on Patentability for International Application No. PCT/US05/15001, dated Nov. 23, 2007 (5 pages).
International Preliminary Report on Patentability for International Application No. PCT/US05/15129, dated Feb. 24, 2009 (6 pages).
International Preliminary Report on Patentability for International Application No. PCT/US2005/006853, dated Sep. 5, 2006 (7 pages).
Japanese Office Action with English translation for Application No. 2007-511049, dated Sep. 21, 2010 (7 pages).
U.S. Appl. No. 12/947,702, filed Nov. 17, 2010, Inventors: Christopher John Davie, et al., entitled "*System and Method for Wagering in a Financial Market Environment*" (62 pages).
USPTO Office Action for U.S. Appl. No. 11/536,059, Dec. 13, 2010 (10 pages).
Around the World in Eighty Days, United Artists, 1956 (Wikipedia description attached), downloaded Dec. 13, 2010 (8 pages).
Australian Examiner's Report for Application 2009243500, dated Feb. 15, 2011 (3 pages).
www.financial-spreadbetting.com/—Financial Spread Betting, A Trader's Guide, URL: http://web.archive.org/web/20040127223015/http:/ /www.financial-spread-betting.com/ Jan. 27, 2004.
USPTO Notice of Allowance and Fees Due and Examiner Interview Summary for U.S. Appl. No. 12/726,954, Dec. 22, 2010 (23 pages).
USPTO Notice of Allowance and Fees Due for U.S. Appl. No. 10/836,999, Jan. 21, 2011 (6 pages).
USPTO Office Action for U.S. Appl. No. 12/563,985, dated Apr. 19, 2011 (5 pages).
European Communication and Supplementary Search report for Application No. 07841129.5, mailed May 3, 2011 (7 pages).
Japanese Office Action with English translation for Application No. 2007-501964, mailed May 17, 2011 (4 pages).
USPTO Notice of Allowance and Fees Due for U.S. Appl. No. 10/836,999, Apr. 28, 2011 (7 pages).
USPTO Office Action for U.S. Appl. No. 12/947,702, May 3, 2011 (8 pages).
USPTO Office Action for U.S. Appl. No. 11/467,047, Apr. 22, 2011 (6 pages).
USPTO BPAI Decision for U.S. Appl. No. 11/536,094, Apr. 27, 2011 (8 pages).
Japanese Office Action with English translation for Application No. 2007-502051, mailed May 17, 2011 (7 pages).

(56) References Cited

OTHER PUBLICATIONS

Japanese Office Action with English translation for Application No. 2007-502044, mailed Jun. 7, 2011 (5 pages).
USPTO Notice of Allowance and Fees Due for U.S. Appl. No. 11/536,094, Aug. 19, 2011 (8 pages).
Notification of Transmittal or Search Report and Written Opinion of the ISA or the Declaration for International Application No. PCT/US07/76368, dated Sep. 15, 2008 (6 pages).
International Preliminary Report on Patentability for International Application No. PCT/US07/76368, dated Feb. 24, 2009 (7 pages).
International Preliminary Report on Patentability for International Application No. PCT/US05/07219, dated Sep. 5, 2006 (5 pages).
International Preliminary Report on Patentability for International Application No. PCT/US05/07199, dated Sep. 5, 2006 (5 pages).
Australian Notice of Acceptance for Application 2005220915, dated Sep. 8, 2011 (3 pages).
USPTO Pre-Brief Appeal Conference Decision for U.S. Appl. No. 11/536,059, Oct. 11, 2011 (4 pages).
Australian Examiner's Report for Application 2005241468, dated Oct. 11, 2011 (2 pages).
Canadian Examiner's Report for Application 2,661,630, dated Oct. 13, 2011 (2 pages).
USPTO Office Action for U.S. Appl. No. 12/947,702, Oct. 21, 2011 (7 pages).
USPTO Notice of Allowance and Fees Due for U.S. Appl. No. 11/467,047, Oct. 21, 2011 (9 pages).
USPTO Notice of Allowance and Fees Due for U.S. Appl. No. 12/563,985, dated Oct. 28, 2011 (7 pages).
European Supplementary Search report for Application No. 04758725.8, dated Oct. 10, 2011 (1 page).
USPTO BPAI Decision for U.S. Appl. No. 11/535,662, Dec. 1, 2011 (6 pages).
Canadian Examiner's Report for Application 2521222, dated Dec. 15, 2011 (3 pages).
Japanese Notice of Allowance for Application No. 2007-511049, dated Dec. 27, 2011 (3 pages).
USPTO BPAI Record of Oral Hearing held on Nov. 17, 2011 for U.S. Appl. No. 11/535,662, mailed Jan. 10, 2012 (8 pages).
USPTO Notice of Allowance and Fees Due for U.S. Appl. No. 11/535,662, mailed Feb. 17, 2012 (7 pages).
European Communication and Supplementary Search Report for Application No. 05737600.6, dated Feb. 2, 2012 (3 pages).
European Communication and Exam Report for Application No. 05724708.2, dated Mar. 13, 2012 (5 pages).
Australian Examiner's Report for Application 2011235977, dated May 8, 2012 (2 pages).
USPTO Office Action for U.S. Appl. No. 12/947,702, Jul. 25, 2012 (10 pages).
USPTO Notice of Allowance and Fees Due for U.S. Appl. No. 11/536,059, May 21, 2012 (7 pages).
Canadian Examiner's Report for Application 2,558,675, dated May 24, 2012 (4 pages).
USPTO Notice of Allowance and Fees Due for U.S. Appl. No. 11/536,059, Aug. 29, 2012 (6 pages).
USPTO Office Action for U.S. Appl. No. 13/477,210, Oct. 4, 2012 (8 pages).
European Communication for Application No. 05737600.6, dated Jul. 26, 2012 (3 pages).
European Communication for Application No. 04758725.8, dated Oct. 15, 2012 (5 page).
USPTO Office Action for U.S. Appl. No. 13/099,954, Jul. 18, 2012 (13 pages).
Japanese Office Action with English translation for Application No. 2007-502044, dated Sep. 11, 2012 (5 pages).
European Communication for Application No. 07841129.5, mailed Apr. 30, 2012 (7 pages).
Japanese Office Action with English translation for Application No. 2009-525727, dated Oct. 17, 2012 (14 pages).
Examiner Interview Summary Record for U.S. Appl. No. 13/158,583, dated Jun. 27, 2012, 2 pages.
USPTO Office Action for U.S. Appl. No. 13/477,191, Mar. 6, 2013, 10 pages.
USPTO Notice of Allowance and Fees Due for U.S. Appl. No. 12/947,702, Mar. 29, 2013 (11 pages).
USPTO Office Action for U.S. Appl. No. 13/099,954, Apr. 16, 2013 (35 pages).
Canadian Examiner's Report for Application 2,661,630, Mar. 25, 2013 (2 pages).
USPTO Notice of Allowance and Fees Due for U.S. Appl. No. 13/435,158, dated May 3, 2013 (8 pages).
USPTO Notice of Allowance and Fees Due for U.S. Appl. No. 13/021,979, May 22, 2013 (10 pages).
USPTO Office Action for U.S. Appl. No. 13/477,210, May 22, 2013, 9 pages.
USPTO Office Action for U.S. Appl. No. 13/615,491, Jun. 13, 2013, 6 pages.
Australian Examiner's Report for Application 2012247034; 3 pages; Jun. 28, 2013.
Canadian Office Action for Application 2521222, dated May 14, 2013 (2 pages).
Australian Examiner's Report for Application 2011232742; 3 pages; May 7, 2013.
Japanese Office Action with English translation for Application No. 2009-525727, dated May 15, 2013 (6 pages).

COMPUTER GRAPHICS PROCESSING METHODS AND SYSTEMS FOR PRESENTATION OF GRAPHIC OBJECTS

RELATED APPLICATIONS

The present application is a continuation of U.S. patent application Ser. No. 11/536,059, filed Sep. 28, 2006, which is a continuation of U.S. patent application Ser. No. 11/467,047, filed Aug. 24, 2006, which is a continuation-in-part application of U.S. patent application Ser. No. 10/794,666, filed Mar. 5, 2004.

Each of the above-referenced applications are incorporated by reference herein as part of the present disclosure for purposes of written descriptions and enablements only.

BACKGROUND OF THE INVENTION

The present application relates graphics processing methods and systems and, more particularly, to a system and a method for displaying graphic objects or text on an interactive display in a wagering environment.

SUMMARY OF THE INVENTION

In accordance with at least one aspect of the present disclosure, computer graphics processing systems and methods are provided for the presentation of graphic objects or text in a wagering environment. In at least one embodiment, a computer graphics processing method is provided for presenting graphic objects on a graphic user interface screen that includes the step or steps of receiving a request for wagering information, and causing the graphic interface screen to be displayed at a user interface. The graphic interface screen includes a reference betting line, such as a market betting line having a value that corresponds to a value of a reference variable associated with an object, such as the market value of an object. Alternatively or additionally, the interface screen may include a high line having a value corresponding to an amount above the reference variable value, a low line having a value corresponding to an amount below the reference variable value or at least one or a plurality of spread lines. The market, high, low, and spread lines may be arranged spatially on the interface screen based at least on the values of each of the lines.

In one embodiment, the interface screen includes a least one graphic object, computer generated or otherwise, associated with each of the betting lines. The at least one graphic object is selectable for submitting at least one of an up bet request and a down bet request. The at least one graphic object may be rotating or moving when in a tradeable state. The interface screen may further include odds associated with the at least one of the up bet request and the down bet request superimposed over the graphic object. In one embodiment, the interface screen and/or at least one of the market or reference betting line, the high line, the low line, the spread lines, and the odds are refreshing automatically to reflect movement in the market value of the object.

Additional aspects of the present invention will be apparent in view of the description which follows.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
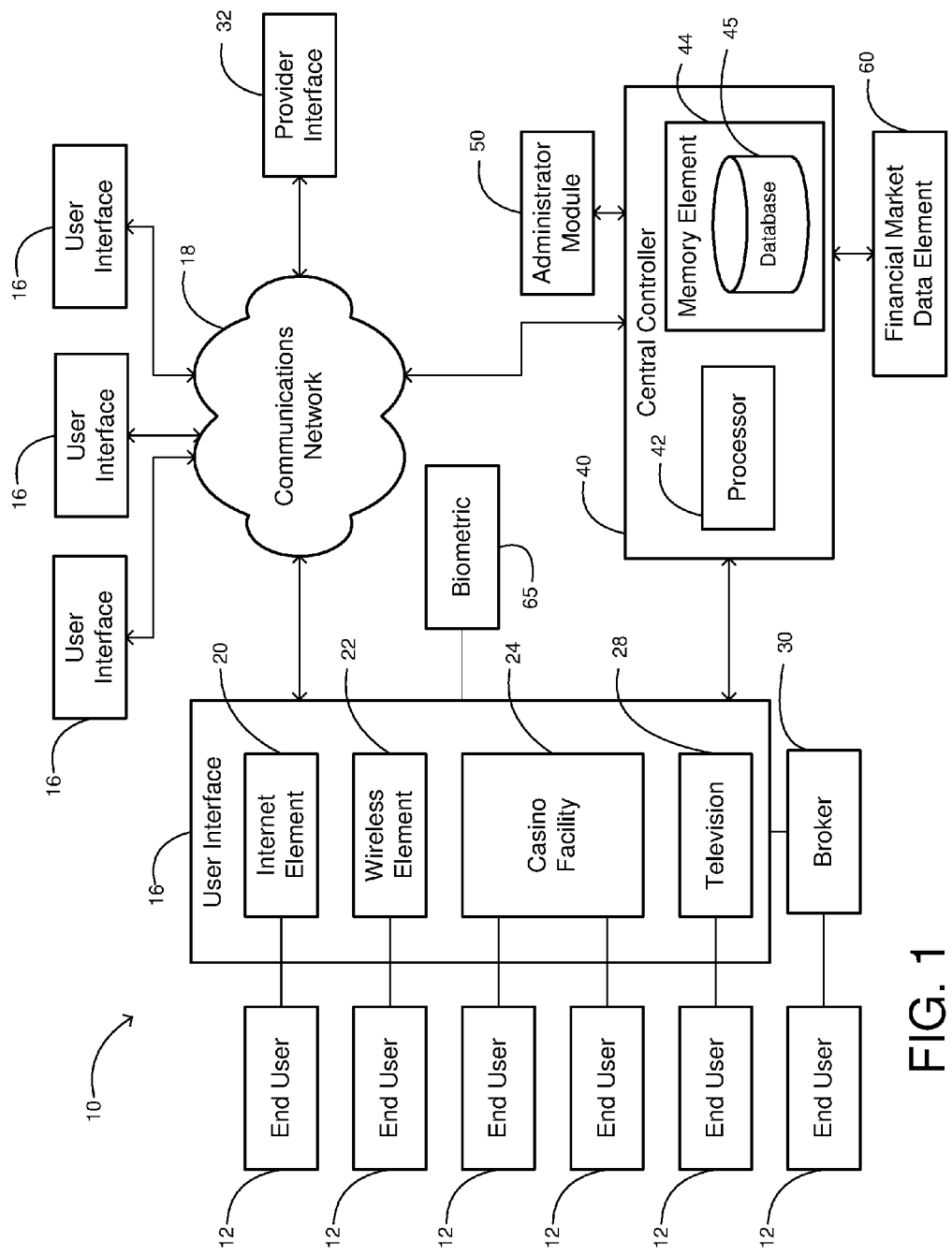
FIG. 1 is a block diagram of a gaming system for wagering on events in a market environment in accordance with at least one embodiment of the systems disclosed herein.

FIG. 1 is a block diagram of a gaming system 10, according to at least one embodiment of the systems disclosed herein, which provides at least one graphic user interface screen allowing users therewith to place wagers or bets on events occurring in a financial or other market environment, as disclosed herein. In one embodiment, gaming system 10 comprises at least one central controller 40 coupled or otherwise in communication with a over a communications network 18 with at least one user interface 16, for use by one or multiple end users 12. Gaming system 10 may also include or be associated with an administrator module 50 and a financial market data element 60.

User interface 16 may include one or a number of elements that provide connectivity and/or interactivity for one or more end users 12 with other elements within gaming system 10. User interface 16 may include, for example, a processor, a memory, one or more input and/or output devices, such as a keyboard, mouse, display, etc., an Internet element 20, a wireless element 22, a casino facility element 24, a television (or display) element 28, etc. Each one of the elements may provide its relative functionality in the form of hardware, software, or a combination thereof.

Central controller 40 may include a processor 42 and a memory element 44, and may also include software stored thereon that when executed performs one or more of the steps of the methods or otherwise provides the functionality described herein. In one embodiment, central controller 40 generally provides the backend functionality for the methods described herein and user interface 16 provides the front-end functionality.

Gaming system 10 may, in certain embodiments, provide increased flexibility and improved opportunities for diversification in wagering on events in a number of financial or other markets. Although the methods and systems may be described herein by way of example in relation to wagering on events occurring in financial markets, such as one or more indices achieving a certain price level at the end of a betting session, it is understood that the methods and systems of the present application are equally applicable to betting on other events, e.g., unrelated to financial markets, such as sporting events, horse or dog racing, casino games, lotteries, etc., and is thus not limited thereto. Moreover, although the methods and systems may be described in terms of market price or value, it is further understood that the methods and systems of the present application are applicable to non-price reference variables, such as trading volume, bid size, asking size, earnings, sports and non-sport scores or metrics, jackpots, etc., and is similarly not limited thereto. The methods and systems of the present application are generally applicable for wagering on the value of a reference variable associated with any object, which value is subject to change over time. As such, the present application provides methods and systems that provide users therewith wagering opportunities based on whether the value of the reference variable achieves a specific level at a particular time.

In certain embodiments, the gaming system 10 provides betting opportunities or betting products for wagering on events occurring in financial or other markets and determines the odds for the occurrence of the events in the market. The terms "betting opportunities" and "betting products" are used herein synonymously. For example, system 10 may determine the odds for betting on the value of a security, a plurality of securities, an index, etc., moving in a certain direction or achieving a certain price level or levels in a moving market, as discussed below, and may further provide betting opportunities on whether the value of the security satisfies at least one of these betting conditions at one or a plurality of times over the trading day. In this respect, the gaming system 10 may divide the trading day into multiple intraday betting sessions each having an opening time and expiration. The trading day may therefore be considered to have multiple intraday expires. The betting sessions may be object specific or generic for all objects. That is, the opening time may be scheduled to occur at different times for certain objects or at the same for all objects.

Gaming system 10 may further include a pricing engine, e.g., a software component or module, that is operable to: 1) determine one or a set of moving or static odds around static or moving market lines, respectively; 2) determine a correct moving market line in relation to static odds; and/or 3) to receive betting information in order to determine and/or display liability management information in relation to the financial fixed odds betting activity.

With regard to moving odds/static line betting products, system 10 provides an interface screen that displays odds around a reference betting line that has a value that remains unchanged for the betting session, or, for daily expiries, throughout the trading day. In this instance, system 10 may set the value of the betting line at the value of the reference variable at the beginning of the betting session, i.e., the start time, and determine the odds for the value of the reference variable achieving, at a later time, a level above or below the initial value of the reference variable. System 10 may further determine the odds for the value of the reference variable achieving a different level, preferably dynamically, at different times throughout the betting session, such as to reflect real-time changes in the value of the object. System 10 may therefore provide betting opportunities that allow the end user 12 to place a bet on whether the value of the reference variable achieves a level at the close of the betting session that is above or below the reference variable's initial value with odds and a corresponding payout based on the odds determined and/or set based on the value of the reference variable at the time the end user 12 submits the bet.

Figure 5:
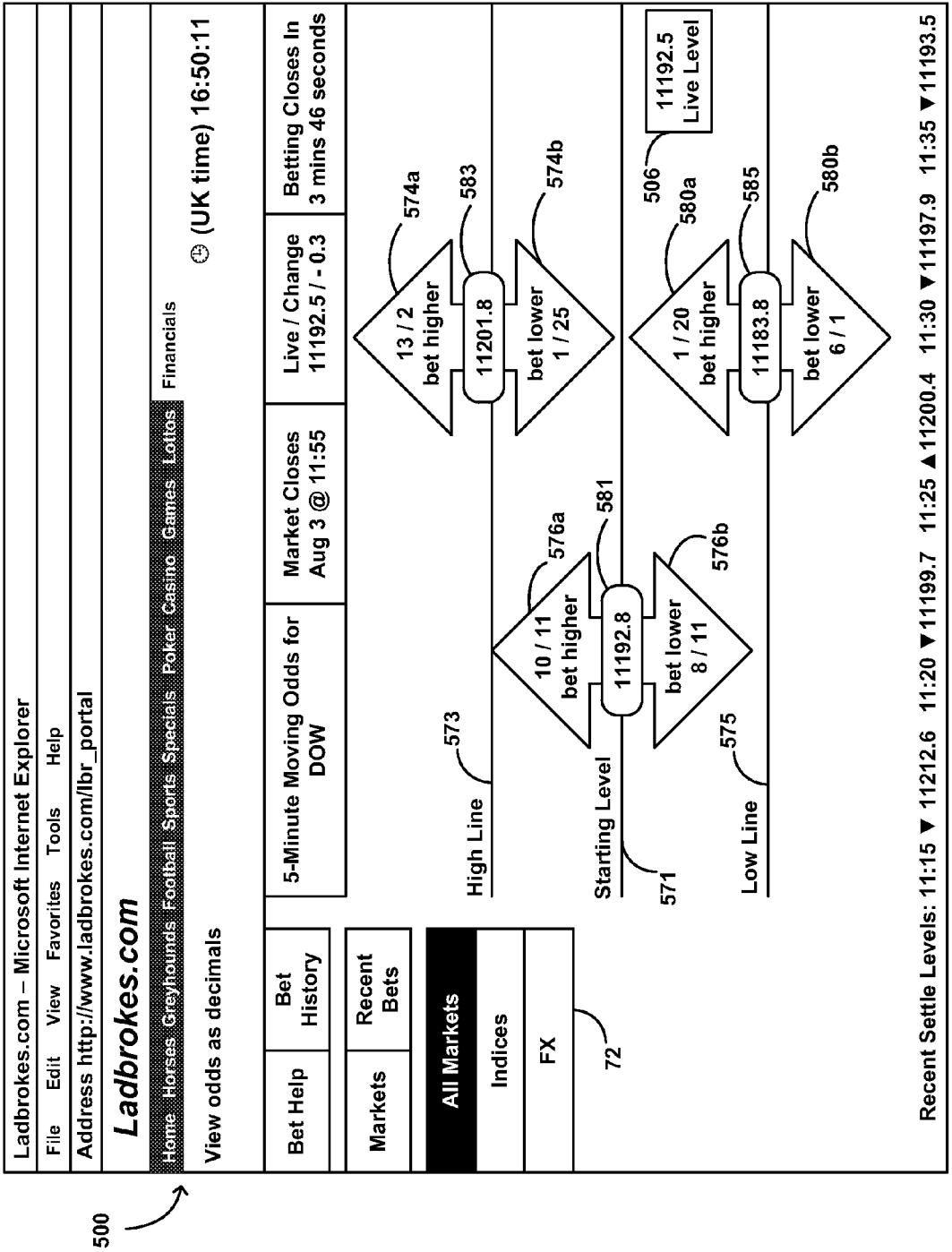
FIGS. 5-11 are interface screens for use in accordance with at least one embodiment of the methods and systems disclosed herein.
Figure 6:
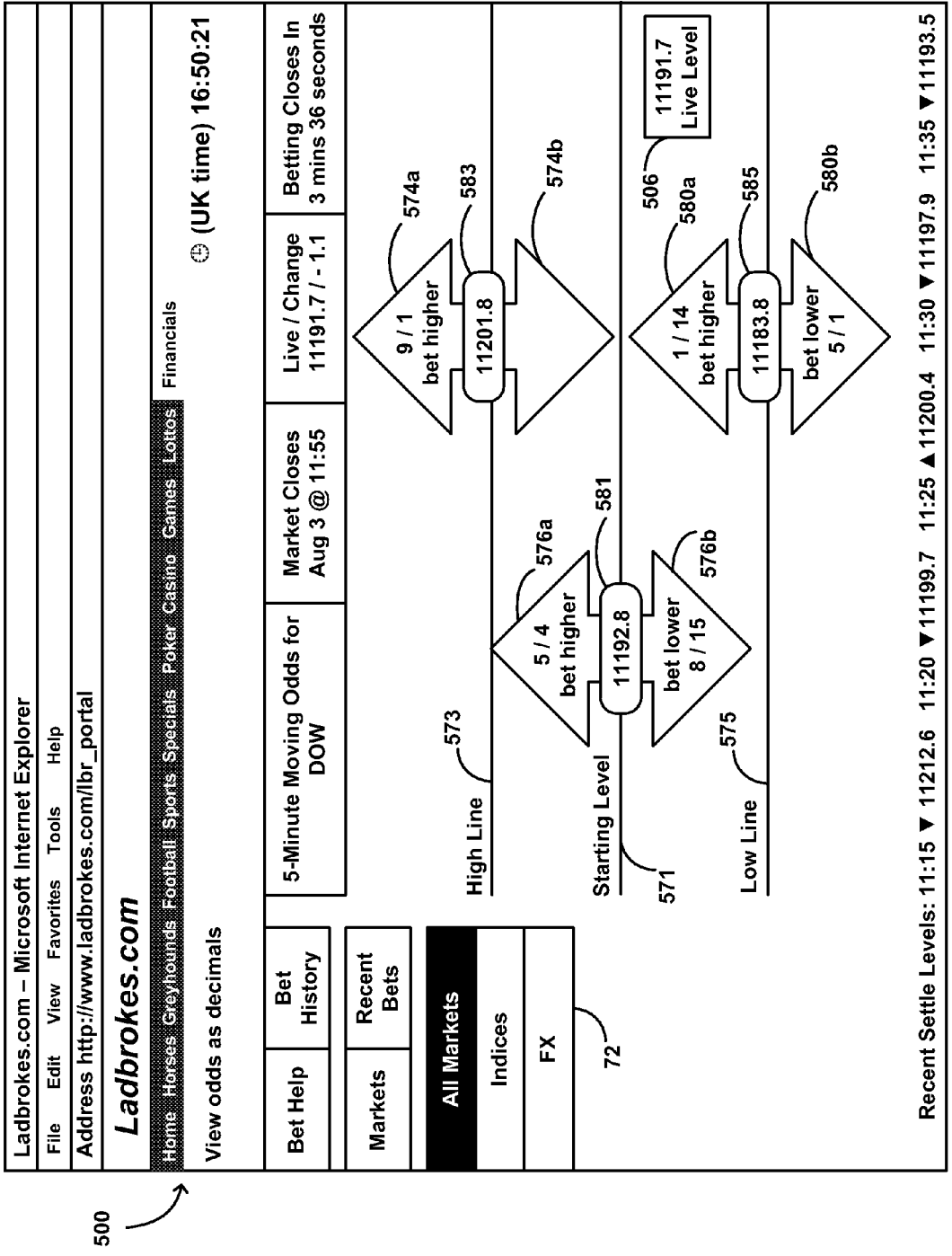
Figure 7:
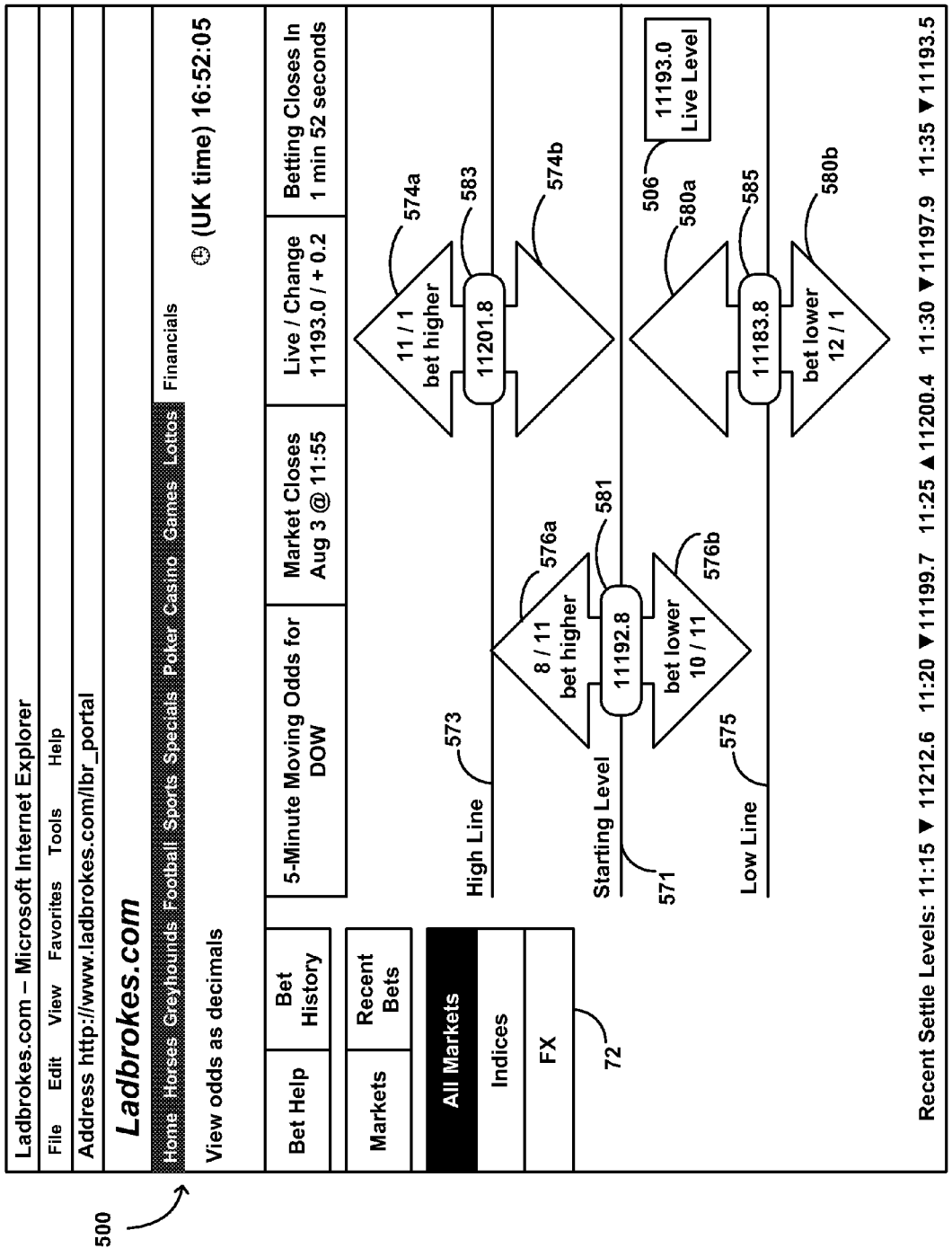
Figure 8:
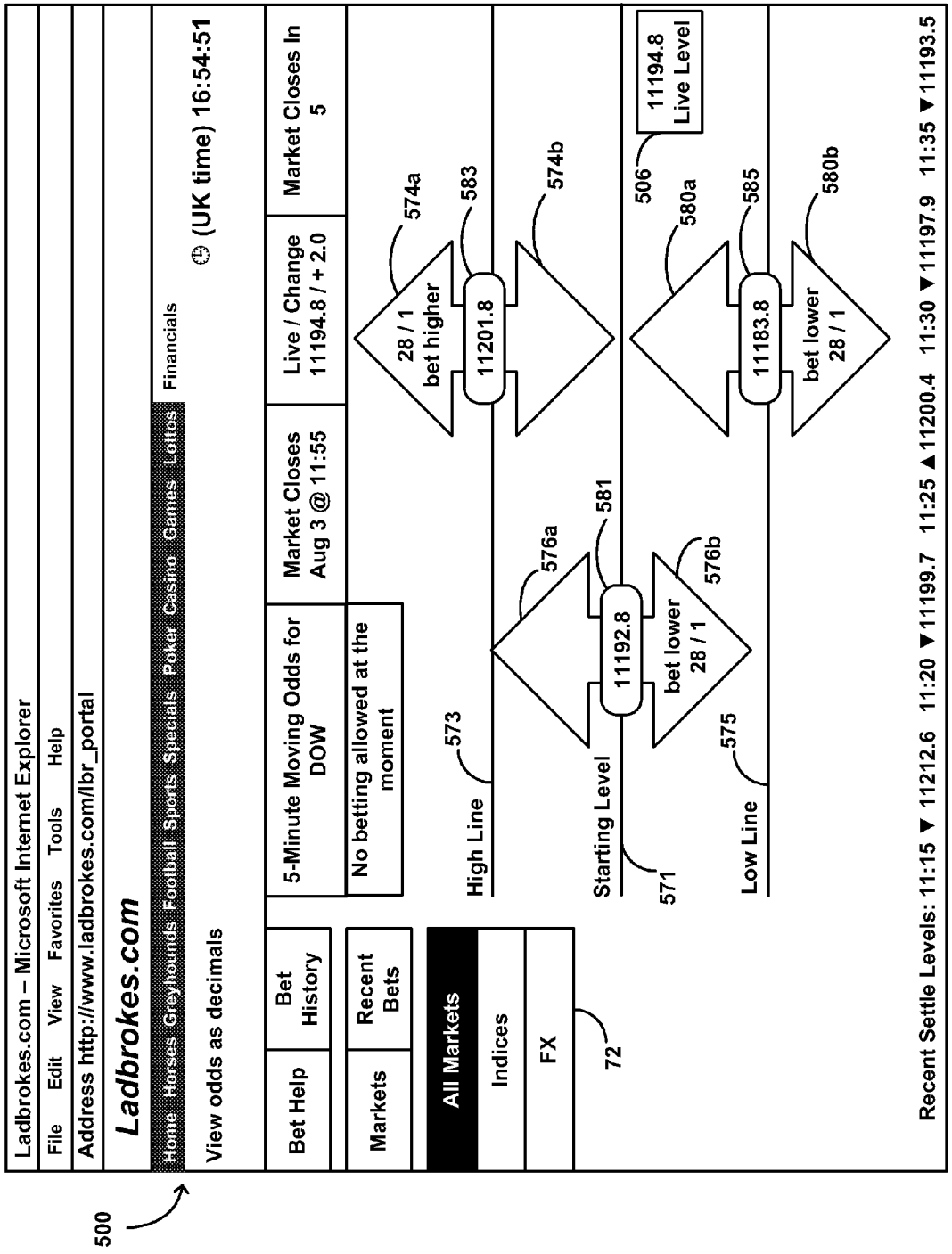

For example, assume that the reference betting line is a static market line, e.g., that corresponds to the market value of the Dow at the beginning of a betting session ($T_1$) is at 11192.8. At a later time in the betting session ($T_2$) the value of the Dow is at a 11192.5 level with odds of the Dow ending above the 11192.8 level at $T_2$ at 10/11, and odds of the Dow ending below the 11192.8 level at $T_2$ at 8/11, as shown in FIG. 5. The odds have generally moved from the initial value of the Dow at the start of the betting session based at least on the market value of the Dow at $T_2$. The end user 12 may then place a bet at time $T_2$ on the up position and "bet up" with a corresponding payout on the wager (W) of (W)*(10/11) or on the down position or "bet down" with a corresponding payout on the wager of (W)*(8/11). The end user 12 may also place bets on the same static market line at later times in the betting session, as shown in FIGS. 6-8, with odds determined at those later times that reflect movement in the market value of the object, e.g., odds based on the market value at the later time. The end user 12 may also place bets on a high line, low line, or spread lines, as discussed in greater detail below.

Figure 10:
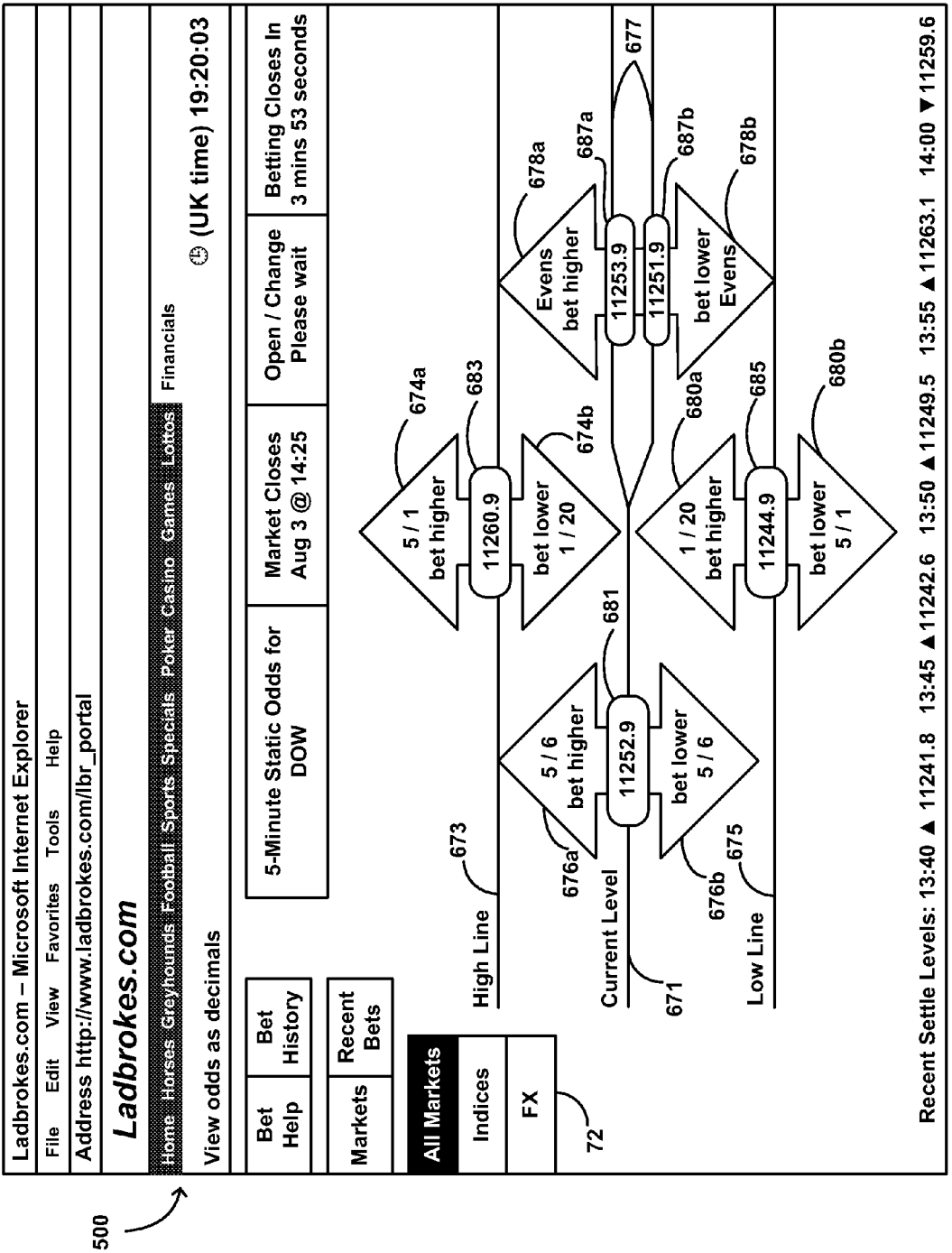
Figure 11:
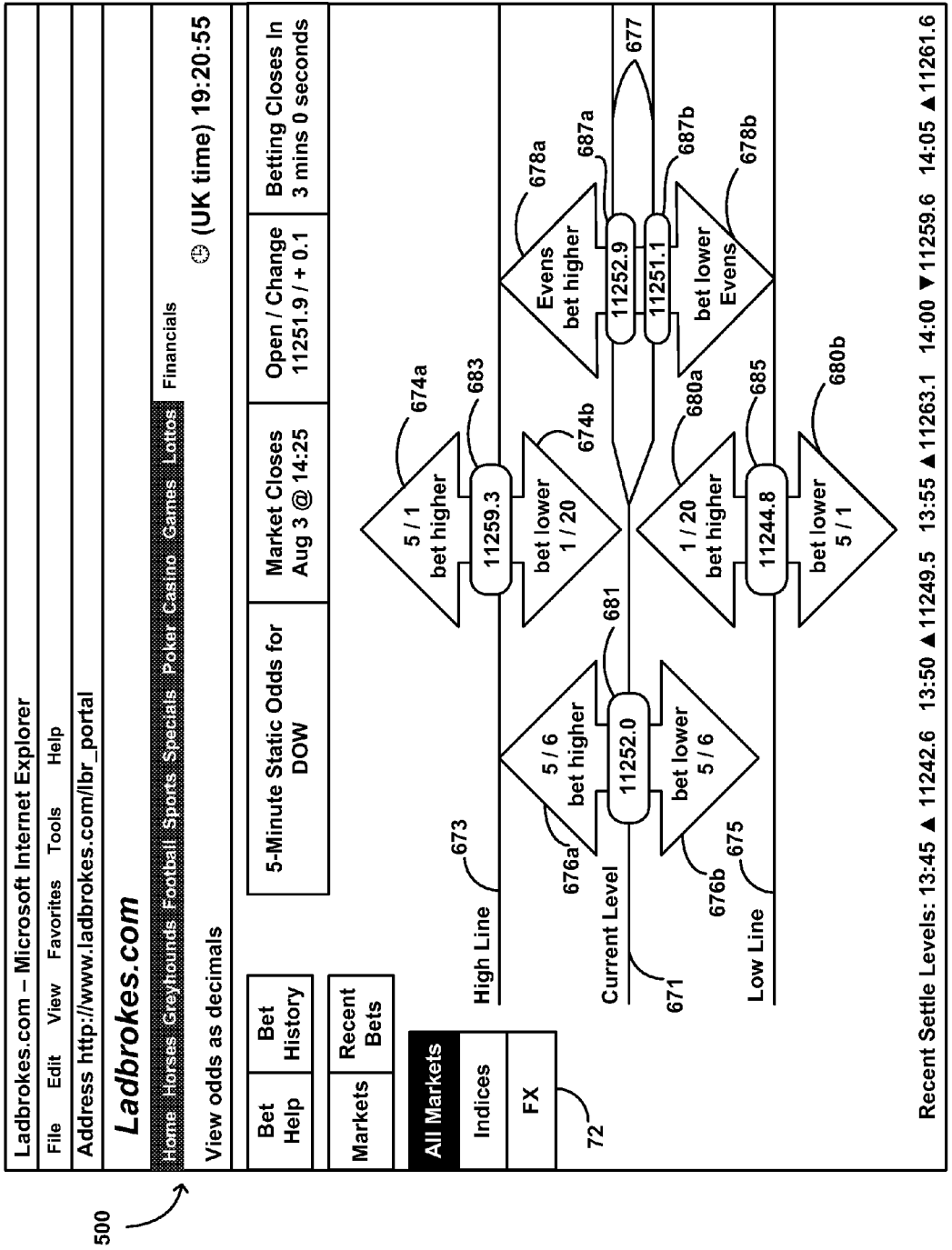

In addition to moving odds/static line wagering, gaming system 10 may also provide static odds/moving line betting products that allows end users 12 to place bets in a dynamic market, where the reference betting line, e.g., the market line, has a value that corresponds to the current value of the reference variable at different times in the betting session to reflect any market shifts and movements. In this instance, system 10 may provide an interface screen with a reference betting line that reflects changes in the value of the reference value, in real-time or otherwise, and determine the odds for the object achieving a different level, e.g., above or below the then current level, at the end of the betting session or trading day. System 10 may then provide betting opportunities allowing the end user 12 to select the then current value for the reference variable and place a bet on whether the value of the reference variable achieves a level above or below the then current selected level at the close of the betting session, with odds and a corresponding payout based thereon essentially static or unchanged at least during the betting session. The static odds, in the moving line embodiment, may be fixed at any time, including at the beginning of the trading day, the beginning of the betting session, etc. For example, an end user 12 may bet that the value of the then current level of the Dow closes either above or below the then current 11252.9 level at a first time in the betting session ($T_1$), as shown in FIG. 10, or that the Dow closes above or below the then current 11252.0 level at a second time ($T_2$), where ($T_2 > T_1$), as shown in FIG. 11. As can be seen in FIGS. 10-11, the odds for wagers on the moving market line are static at 5/6 for both times and in both directions.

As noted above, an end user 12 may bet that a selected market, e.g., the FTSE, will close at a value that is above or below the value of the static or moving market line values. End users 12 may also enjoy additional betting opportunities on static and moving betting lines other than the market betting line. In one embodiment, system 10 provides betting opportunities based on the theory that the market will close above or below certain levels relative to the static or moving reference betting line, such as an amount, for example, approximately 1% above or below the value of the market line, or any other percentage, such as 0.5% to 10%, or more, or approximately 9 units above or below the value of the market line, or any other quantity, such as 1 to 100 units (ticks), or more.

Thus, in the moving odds embodiment, gaming system 10 may provide betting opportunities on a high line level and/or a low line level that is above or below, respectively, a certain amount, such as a percentage or a certain number of units from the value of the reference betting line, such as the static market line, as shown in FIGS. 5-9. End users 12 may then place bets on whether the value of the variable closes above or below the high and/or low line values. In this instance, system 10 may determine the moving odds for the high, low, or any other line levels, preferably dynamically and on a real-time basis during the betting session.

In the static odds embodiment, the gaming system 10 may provide similar betting opportunities on a high line level and a low line level, and may also provide betting opportunities on lines based on a spread around the current value of the reference variable, such as the moving market line, whereby the spread lines include odds that are better (from the perspective of the bettor) than those relating to the non-spread moving market line. Such odds may be essentially even (1/1), as opposed to, for example, 10/11 type odds for the market line. System 10 may therefore determine the moving value of the high, low, and spread line levels, in order to maintain the desired static odds, preferably dynamically and on a real-time basis during the betting session.

Daily expiries, as well as other intraday and longer-term expiries for the betting sessions may also be accommodated by gaming system 10. Bets may be placed on any suitable financial market, such as the FTSE, the German DAX, the French CAC, the NASDAQ, the American Exchange (AMEX), the New York Stock Exchange, the Nikkei, the bond or treasury markets, and the Hang Seng Index, etc. Thus, gaming system 10 may facilitate frequent bet expiries for betting in relation to any number of suitable financial instruments. Bets or betting sessions may also extend to minute-by-minute or thirty-second expiries, or any multiples thereof or amounts there between. On this basis, end users 12 may be provided with the opportunity to bet on multiple events/scenarios throughout the trading day. Accordingly, a targeted financial market can represent a foundation for regular intraday betting activity.

In at least one embodiment, system 10 provides betting sessions with a bet expiry, at least one of: every five minutes, every half hour, every hour, etc., throughout market hours of the trading day, and readily extended to accommodate defined future time frames. For example, where the trading day is divided into sessions having an expiry every five minutes, the wagering opportunities could be defined for the FTSE market (in GMT times) as follows: (Opening Bell) 10.00 am, 10.05 am, 10.10 am, 10.15 am, etc., and continuing to 17.05, 17.10, 17.15, 17.20 (Closing Bell). The same principles apply to other session durations.

System 10 may also allow end users 12 to specify an expiry that they have elected. This may be the imminent forthcoming expiry, or any later occurring expiry. Hence, a client in a betting shop or in an on-line environment may be provided a betting opportunity every minute throughout the day. Settlement could subsequently follow the bet expiry in any suitable manner, e.g., immediately after the expiration, during and/or concurrent with the running of the next or any other later betting cycle, or otherwise.

Gaming system 10 may also provide end users the ability to place bets on sessions with a non-time specified expiry. In such a scenario, a bet expires at a defined delay measured from the moment the bet was struck as opposed to defined or scheduled expiries throughout the trading session. This would allow end user 12 to place a bet at any time throughout the day knowing that the bet so placed will expire, for instance, five minutes, or any other predetermined time after the bet was placed. For example, a bet placed at 12:07:35 with a five minute expiry specified will settle beginning at 12:12:35. Thus, bets would not necessarily expire for all participants at nominal intervals, but instead expire on a defined post, i.e., on a delayed basis, from the time the bet is placed.

Another capability that flows from the arrangement of gaming system 10 is that sophisticated participants would be able to continually adjust their overall risk participation or exposure, for instance, by betting one way in an individual transaction and taking the opposite position with respect to the outcomes of a plurality of other events. For example, a participant might first wager that the NASDAQ will appreciate in price, but also take a short position in the Russell 2000. Such a blended risk-participation strategy allows participants to effectively balance or hedge their wagers and their betting portfolio in a manner similar to an investor hedging an investment portfolio by offsetting trading in the underlying securities.

End users 12 are clients, customers, prospective investors, or any individuals or entities wishing to place a wager. End users 12 may also seek to access or to initiate a communication with user interface 16 that may be delivered to and from the central controller 40 via communications network 18. End users 12 may review data, such as performance characteristics of the underlying objects being traded, associated with a particular market in order to take a position, e.g., place a wager, on any given target. Alternatively or in addition, end users 12 may represent any device or object that seeks to initiate a communication on behalf of another entity or element, such as a program, a database, or any other component, device, element, or item capable of initiating a voice or a data exchange within gaming system 10. The term "data", as used herein, refers to any type of numeric, voice, or script data, or any other suitable information in any format that may be communicated from one point to another.

End user 12 may participate in a wager or bet, which represents the legal instrument that may be used to bind end user 12 to a stipulated agreement. A wager may take any appropriate form such as a written document, an electronic file, such as an e-mail, a database entry, a facsimile message, a computer display, an entry in an account, a verbal agreement between two parties, etc., or a combination thereof. Such a wager is flexible in its terms, representations, and stipulations. In general, any information or data that may be germane or of interest to a betting participant or a hosting entity may be included in a wager, provided that the included terms are mutually agreeable to the two (or more) parties bound by the wager.

User interface 16 may be any device that facilitates wagering on a selected financial or other market. User interface 16 is generally operable, either alone or in combination with central controller 40, to communicate at least one request associated with the wagering transactions and/or betting opportunities disclosed herein. User interface 16 may also provide a portal for end users 12 to access other elements of gaming system 10 and communicate information, such as information relevant to the betting opportunities provided herein and bets in response thereto, to and from the relevant components of the gaming system 10. User interface 16 may be a computer, a server, a management center, a single workstation, or a headquartering office for any person, business, or entity that seeks to manage or facilitate wagering activity. Accordingly, user interface 16 may include any suitable hardware, software, devices, components, elements, or items that may be utilized or implemented to achieve such operations and functions in a gaming environment.

In one embodiment, user interface 16 comprises any one or more of a selection of elements, such as an Internet element 20, a wireless element 22, a casino facility element 24, television element 28 or any other receiver for displaying cable, satellite, closed-circuit, etc., images or information, a biometric element 65, etc. Any suitable number and combination of interfaces may be implemented in gaming system 10 according to usage, traffic, architecture, and other considerations.

User interface 16 may be any other suitable interface or object that facilitates communications between end user 12 and any other element within gaming system 10, such as: a cellular telephone, an electronic notebook, a personal digital assistant (PDA), a personal or laptop computer, a special purpose handheld device, or any other suitable device, wireless or otherwise, component, or element capable of accessing one or more elements within gaming system 10. User interface 16 may also comprise any suitable interface for a human user to interact with system 10, such as a display, a microphone, a keyboard, a camera, a mouse, a roller ball, a touch screen display, a biometric sensor, or any other appropriate terminal equipment according to particular configurations and arrangements. In addition, user interface 16 may be a unique element, e.g., a special purpose computing device, designed specifically for communications involving a wager as disclosed herein. Such an element may be fabricated or produced specifically for financial applications involving end user 12.

User interface 16 may be owned and operated by any suitable entity having the ability and/or authority to operate in the gaming industry. A direct connection may be present between user interface 16 and any financial or other exchange, whereby information associated with the exchange is delivered to end user 12 and may be reviewed before executing the transaction. Thus, user interface 16 may deliver real-time market and/or financial data to end user 12 in order to provide pertinent information to be used to make decisions as to whether to place, purchase, or to sell a wager. This financial information may be retrieved from financial market data element 60 or any other suitable element, such as the direct connection described above. Financial market data element 60 may relay data, such as pricing information, market line values, maturity data, financial graphs, and charts, historical quotes, or moving averages, for example, to end users 12. Other pertinent financial data may also be readily delivered based on particular needs.

In order to deliver information that is accurate and timely, financial market data element 60 may be coupled directly to a corresponding exchange communications link that carries such financial data. Alternatively, financial market data element 60 may gather such information from any appropriate location, e.g., a news wire or a server operable to deliver real-time information to investors, such that the desired data is delivered to end user 12. Financial data element 60 may be embodied in software, hardware, or a combination thereof. System 10 may store information received from or in connection with the financial data element 60 in one or more databases.

User interface 16 may also include or be at least one self-service betting machine. In some embodiments, self-service betting machines allow end users 12 to insert payment into a machine, such as cash or by using a voucher or a credit/debit card, place one or more bets therewith, and receive a printout, such as a ticket, confirming that the bet was placed. The user interface 16 may also include a biometric element 65, such as a fingerprint reader or any other biometric sensor, for authenticating the user's identify. The biometric data produced with the biometric sensor may be used to verify the user's identity for account access, electronic fund transfer, etc. For example, the biometric data may be communicated from the interface 16 to the central controller 40 where the data is compared with stored biometric data for the particular user. If the biometric data match, the user may then continue to wager in accordance with the methods disclosed herein. Moreover, the results of the biometric data match may be communicated to a third party, such as a bank, which may transfer funds electronically from a user's account with the third party to one or more of the user's wagering accounts with the gaming system provider based on the biometric match.

Printouts for winning bets may be inserted back into the self-service betting machine to receive a payment or a voucher, which may be used to receive a payout from a teller. In other embodiments, self-service betting machines allow end users 12 to use a credit card, a debit card, or a smart card to place bets. The credit or debit card may have an associated account, which may be a betting account provided and/or managed by a betting account provider using, for example, a centralized computer system. The account and information pertaining thereto may also be stored in an end-user profile, such as that which is described below with reference to FIG. 3. The smart card may itself store information regarding a betting account and various bets. In some embodiments, after the expiration of the bet, end user 12 may insert or swipe his or her credit, debit, or smart card in the self-service betting machines in order to update the balance on the card.

User interfaces 16 may also be implemented with one or more telephone operators and one or more websites. End users 12 may access or communicate with such interfaces in any appropriate manner. Telephone operators may communicate betting information to and take bets from end users 12. Similarly, websites may communicate betting information to end users 12 and allow end users 12 to place bets therewith. One or more of such websites may be hosted by one or more servers associated with an owner or operator of gaming system 10.

Figure 3:
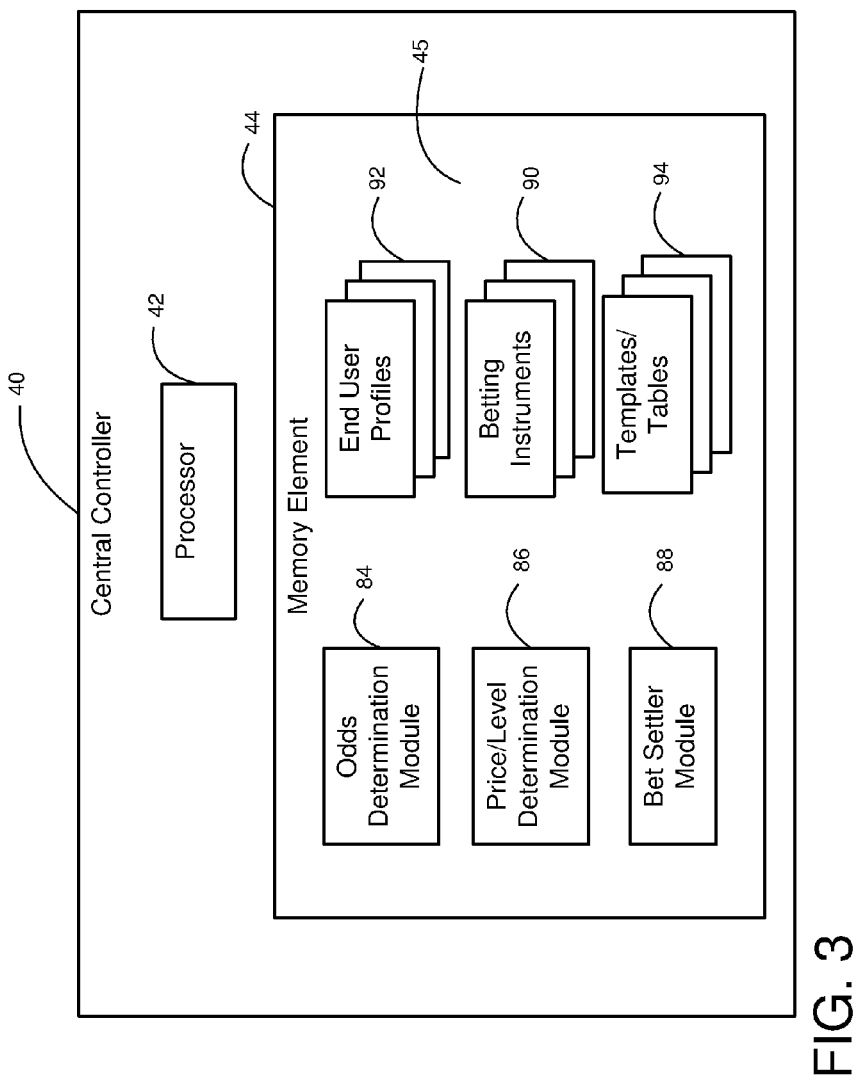
FIG. 3 is a block diagram of a central controller in accordance with at least one embodiment of the systems disclosed herein.

An Internet betting provider may provide Internet account wagering by providing online betting accounts to one or more end users 12. Using an online betting account, a client may interface with one or more websites associated with the Internet betting provider in order to fund the account, view betting information regarding betting events, e.g., moving and static odds, moving and static reference, market, high, low, and spread lines, historic data, etc., and place bets. Such online betting accounts may include one or more various types of accounts, such as deposit accounts, credit accounts, margin accounts, stop-loss accounts, and hybrid accounts, for example. Such accounts and the contents thereof may be stored in an end-user profile, as illustrated in FIG. 3.

Communications network 18 is a communicative platform operable to exchange data or information between end user 12, user interface 16, and/or central controller 40. Communications network 18 may be an Internet architecture, which provides end user 12 with the ability to electronically execute or initiate transactions associated with a wager. Alternatively, communications network 18 could be a plain old telephone system (POTS), which end user 12 could use to perform the same operations or functions. Such transactions may be assisted by a broker 30 associated with user interface 16 or manually keyed into a telephone or other suitable electronic equipment in order to request that a transaction be executed. In other embodiments, communications network 18 could be any packet data network (PDN) offering a communications interface or exchange between any two nodes in gaming system 10. Communications network 18 may alternatively or in addition be any local area network (LAN), metropolitan area network (MAN), wide area network (WAN), wireless local arena network (WLAN) virtual private network (VPN), intranet, or any other appropriate architecture or system that facilitates communications in a network or telephonic environment, or a combination thereof.

In one embodiment, central controller 40 includes processor 42 and memory element 44. Central controller 40 is generally operable to provide the backend functionality with regard to the methods described herein, such as receive requests from end user 12, and to process those requests such that wagers based on events occurring in a market environment, such as financial transactions in a financial market, may be executed. The resultant wager that is generated may be suitably stored in memory element 44, such as in a database 45 or in any other suitable form, after being properly managed and secured by processor 42. Processor 42 may also assist in processing any betting terms or conditions, e.g., desired expiration, type of exchange, odds, reference line, market line, high line, low line, spread line values, etc., requested by end user 12. In cases where central controller 40 is unable to match the requested betting parameters or tendered wager terms provided by end user 12 with that which is available in the market place, central controller 40 may contact end user 12 and notify end user 12 of the circumstances surrounding the inability to fulfill such a wager.

Processor 42 may comprise any suitable processor that executes a betting system application or other computer instructions that facilitate wagering. Processor 42 may be a CPU and/or a microprocessor, and may include any suitable number of processors working together. Processor 42 is generally operable to execute software, various algorithms, computations, or calculations to determine current bet data, such as betting values, betting odds, market, high, low, or spread lines, moving or static, and/or potential payout data, etc., to perform authentication, verification, or any other function in furtherance of the methods disclosed herein. Processor 42 may determine such current bet data based on data received from memory element 44 and/or financial market data element 60. In addition, processor 42 may update such current bet data based on new information being received from financial market data element 60. In some embodiments, processor 42 may update current bet data in real-time, substantially in real-time, or at preset intervals, such as every five to thirty seconds. In addition, processor 42 may perform the operations described herein to establish wagering odds, moving market lines or levels, and provide betting opportunities to end users 12 based thereon. In other embodiments, odds are determined external to gaming system 10 and simply fed to central controller 40 from an external link.

Memory element 44 may comprise one or more memory devices that facilitate wagering or that store information relating thereto, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors, hard drives, optical media, magnetic media, etc., or a combination thereof. Memory element 44 is also generally operable to store data that may be used by processor 42 in determining odds and/or payouts. In addition to storing betting information, the memory element 44 may store software thereon that when executed performs some or all of the functions disclosed herein.

It should be noted that the internal structure of central controller 40 is malleable and can be readily changed, modified, rearranged, or reconfigured in order to achieve its intended operations. Accordingly, central controller 40 may be equipped with any suitable component, device, application specific integrated circuit (ASIC), hardware, software, processor, algorithm, ROM element, RAM element, EPROM, EEPROM, or any other suitable object that is operable to facilitate the operations of central controller 40. Considerable flexibility is provided by the structure of central controller 40 in the context of gaming system 10.

In an alternative embodiment, user interface 16, communications network 18, and/or central controller 40 may be replaced entirely or partially with a person, providing a human interface between end user 12 and a wager involving a financial market. In such an embodiment, an agent of user interface 16 (or any other suitable person or representative) may be contacted by end user 12, e.g., via the telephone, a network, other suitable electronic equipment, or directly by word of mouth. The agent or representative may receive a request from end user 12 to execute a transaction involving a wager, such as submitting a bet request, the terms of the bet request, etc. The agent or representative may then proxy or broker the request to an appropriate entity for execution of the wager. The agent or representative may then record the transaction once it has been consummated and subsequently contact end user 12 to confirm that the transaction has been executed. A receipt of any suitable type may then be issued to end user 12 indicating the terms of a wager. Additional details relating to the internal structure of central controller 40 are provided below with reference to FIG. 3.

Administrator module 50 is an element that cooperates with central controller 40 in order to ensure a fair and proper execution of wagering transactions initiated by end user 12. Administrator module 50 is an optional component of gaming system 10. Administrator module 50 may be used in certain embodiments to control any operation of central controller 40. For example, administrator module 50 may be used to manually set betting odds, to approve margin requests or individual bet requests, or to halt specific wagering activities. In selected instances, administrator module 50 may call for additional margins throughout the day without waiting for a routine end-of-day settlement. In still other scenarios, administrator module 50 may be used for general monitoring functions. In this instance, the administrator module 50 may serve as an interface for users to submit at least one query for data stored in the system, such as in a table or database. The module 50 may also serve as an interface for parsing, extracting, filtering, removing, etc., or more generally processing data stored on the system. The administrator module 50 may be accessed with a provider interface 32, which may be any type of device for communicating with the central controller 40 and/or administrator module 50, as may be the end user interface 16. Moreover, the administrator module 50 may be implemented in software, hardware, or a combination thereof.

Figure 2:
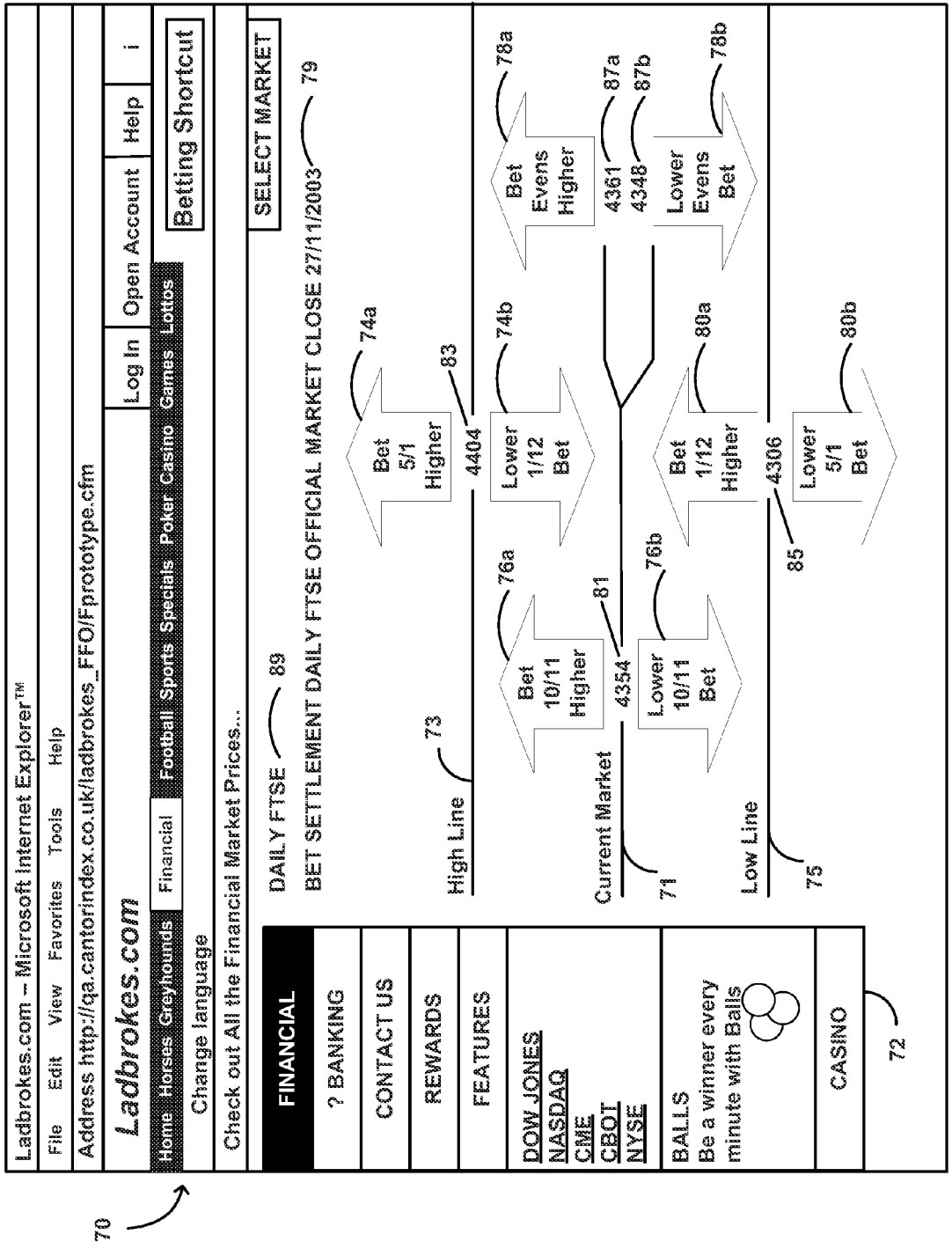
FIG. 2 is an interface screen for use in accordance with at least one embodiment of the methods and systems disclosed herein.

FIG. 2 shows an interface screen or page 70 for use in connection with at least one embodiment of the methods and systems disclosed herein. Interface screen 70 generally provides an opportunity for end user 12 to bet on whether a variable associated with a selected market or object within the market will achieve a level above or below defined market levels or lines, such as the market line 71, high line 73, low line 75, and spread lines 77, at the end of a trading session or trading day, as the case may be. The expirations associated with the bet or bets may be variable as discussed above. For illustrative purposes, the expiry 79 for the interface shown in FIG. 2 is a daily expiry ending at the close of the market The interface of FIG. 2 illustrates that system 10 may produce an interface screen that includes one or more betting lines, graphic objects, buttons, and/or text that collectively provide up to eight betting opportunities, for the static odds and/or the moving odds embodiments discussed above, on the value of one or more reference variables associated with the object, such as the value of an index, a particular security or securities, or any other alienable item. The terms graphic or graphic object are used herein to denote any item that may be displayed on an interface screen and that has been configured to be selected by an end user 12 for submitting a bet request on at least one of the betting opportunities provided therewith, including, but not limited to, static or video images, text, and buttons, etc. The interface 70 may include a list 72 that includes at least one selectable link for placing bets in a selected exchange.

The up to eight available betting opportunities are based on the ability for a user to bet that the specified market or object therein will close above or below one or more of four separately defined levels. In this respect, the interface screen 70 may display at least one betting line having a value 81 corresponding to the selected reference variable of object 89, such as the market price of the object 89, which value 81 may be displayed superimposed on a line 71, with a selectable graphic for a user to place a bet on the up position 76a (an up bet) and at least one selectable graphic for a user to place a bet on the down position 76b (a down bet) relative to the value 81 of betting line 71. The interface screen 70 may similarly display a value for each betting line, such as a value 83 associated with the high line 73, a value 85 associated with a low line 75, and values 87a, 87b associated with spread lines 77, each of the betting lines also corresponding to the value of the selected reference variable, with corresponding graphics for placing bets in either an up or a down position relative to each line.

In one embodiment, the graphic objects display the odds for betting on the particular position made available therewith. The lines may also be displayed on the interface screen 70 in a spatial relationship based on the value of the particular line relative to the other line or lines. As shown in FIG. 2, the lines may be arranged spatially with a lower value line depicted below lines with at a higher value. The spatial distance between lines may move to reflect any narrowing in the spread between lines. The distance, for instance, may narrow to provide a to-scale representation of the betting lines or may expand to provide a zoom in representation of the betting lines. The graphics and/or text displayed on the interface screen may be updated dynamically to reflect changes in the value of the object or changes in the odds for the betting opportunities. The betting data, such as the betting lines and odds, are preferably refreshed automatically without user intervention.

In one embodiment, interface screen 70 includes a high line 73, the current market line 71, and a low line 75 for betting on an index, such as the FTSE. In the static odds embodiment, the value of the current reference betting line, e.g., the market line, is changing, preferably to reflect real-time changes in the value of the index. Accordingly, the high line and the low line values may also be moving based on changes in the moving market level, for instance, if the high and low lines are about 1% of the market value above or below the reference then current market level line, respectively. Note, in more volatile markets or based on particular needs, such high and low lines may be + or − any suitable percentage level or amount from the reference betting line, such as the market line, in order to achieve desired static odds for each betting position.

The high line 73 in the example of FIG. 2 is at 4404. The higher (up bet) and lower (down bet) betting opportunities represent constant fixed or static odds that persist for at least the betting session. The higher odds will generally be odds against the current levels (a short position) and the lower odds will be odds for supporting current levels (a long position or 'odds-on'). Thus, a set of bet graphics 74a and 74b may reflect the short and long positions for the high line, respectively. Bet 74a includes odds of 5/1, while bet 74b includes odds of 1/12. Similarly, a set of bet graphics 80a and 80b may be provided, reflecting the higher (up bet, long position) at 1/12 odds and lower (down bet, short position) at 5/1 odds, respectively.

As noted above, the value of market line 71 may be moving or changing constantly to reflect the actual market level for the object, such as the FTSE, with static odds in relation to the higher (up bet) or lower (down bet) betting opportunities, approximately 10/11 in this example. The then current market line is at 4354 and includes a set of bet graphics 76a and 76b, which represent higher (up bet) and lower (down bet) positions that are both accompanied by 10/11 odds. Additionally, another set of bet graphics 78a and 78b may be provided at derivations of the reference then current market line 71, i.e., at the spread lines. The two bets on the spread lines are offered at levels of 4361 and 4348 respectively, which are computed to provide even betting odds for both the up bet and down bet betting opportunities. Thus, a second near current market level, which is also moving in relation to the market line, is provided that allows customers to bet at even money that the market will expire above or below the market spread, i.e., the spread lines. In this example, a thirteen point spread straddles the reference market middle line and offers additional betting opportunities for end user 12.

The value of the high line and the low line, in addition to reflecting market movements, may also move over time in order to maintain the desired odds static throughout the trading session. The spread between the high line, the market line, and the low line will generally narrow or move closer based at least on remaining time in the session or as the session's expiry draws near. This is also true for the values of the spread lines in order for odds for bets thereon to remain even for the higher (up bet products) and the lower (down bet products) positions (bets 78a and 78b). Thus, such lines are floating, not only in the sense of market movements, but are also converging as time progresses toward the close of the betting session. For example, with five minutes left to go for a wager in a daily betting session, these lines will be quite narrow. Thus, the high line generally comes down and the low line generally goes up during the course of the trading day or betting session, as the case may be, while odds remain relatively consistent.

Note also, over time, as markets or betting sessions close, certain betting opportunities may be disabled or otherwise eliminated based of practical constraints. For example, certain markets generally move in whole number increments. Therefore, spreads that are too narrow to provide betting opportunities practically thereon, e.g., such as the betting opportunities provided with bet graphics 74a, 74b, 78a, 78b, 80a, and 80b, may be disabled as the markets draw to a close.

Betting providers may therefore constrain betting opportunities by disabling, e.g., the high line and the low line if the lines are any closer than five to ten ticks, or any other amount from the market line or from each other. Betting providers may also disable betting opportunities if the odds are too high, such as above or equal to a threshold of 100/1, or too low, such as below or equal a threshold of 1/28. Betting opportunities may be disabled simply by removing the graphic associated with the particular disabled bet or by changing the color of the graphic, e.g., to a color having a different intensity than the original color, and/or removing the odds displayed over the graphic object associated with the particular betting opportunity on the graphic, as shown in FIG. 7. For example, a graphic originally bright red may be replaced with the graphic in a light red color. It is understood that any type of change may be used to indicate that a bet has been eliminated, such as by replacing a moving graphic with a non-moving graphic, a rotating graphic with a non-rotating graphic, an opaque with a transparent or translucent graphic, etc. In addition to disabling the whole line, providers may disable only portions thereof, such as the up bet graphic and/or the down bet graphic.

In one embodiment, the graphics reflect a tradeability state of the betting opportunity. The tradeability state may be at least one of: "tradeable", "viewable", and "off". In the tradeable state, the graphic associated with the betting opportunity is both viewable and tradeable, i.e., users may place bets by selecting the graphic. In the viewable state, the graphic is viewable but not tradeable, e.g., the betting opportunity has been eliminated or otherwise disabled. In the off state, the product is neither vieweable nor tradeable.

The 1/12 and 5/1 odds for long bets 74*b* and 80*a*, and short bets 74*a* and 80*b*, respectively, reflect static odds for their corresponding lines, i.e., 4404 and 4306, which are determined based on the time remaining in the betting session and/or the volatility of the market. Thus, the end user 12 may select graphic 74*a* and submit therewith a bet of $100 with 5/1 odds that the FTSE will close above the high line. At the end of the trading day, if the FTSE closes at 4425, the bet is a winning bet and may be settled thereafter. In this instance, end user 12 would collect $500 (W*(5/1)) from the winning bet plus his original stake, which would yield $600 total. If the end user 12 instead selects graphic 74*b* and submits therewith a bet of $100 with 1/12 odds, at the close of the betting session, the bet would be identified as a losing bet and end user 12 would lose the $100 bet. If, on the other hand, the FTSE closed at 4390, end user 12 would be rewarded with $100(1/12) (the odds offered) plus his original stake. This would yield a return of approximately $108.33 for the winning bet.

As described above, the price or value of the market or other reference line that is being offered to end user 12 can be provided by a communications feed. This feed could reflect daily market conditions and effectively encompass news flow and other financial parameters that could potential affect the market. Other embodiments, described more fully below, offer an owner or operator of gaming system 10 considerable flexibility in setting market lines and odds.

FIG. 3 is a block diagram of central controller 40, according to one embodiment, which may be included within gaming system 10. Central controller 40 comprises processor 42 coupled to memory element 44. Processor 42 may execute one or a number of applications to perform various features and functions for creating betting opportunities in one or more betting sessions, receiving bets thereon, and settling bets on the value of one or more of a plurality of financial instruments, securities, indices, objects, etc. Memory element 44 may store such applications, various incarnations of the betting instruments 90, and/or any other relevant information associated with the betting instruments 90. In a particular embodiment, processor 42 includes or is associated with at least one of an odds determination module 84 that is operable to establish, compute, or otherwise determine odds for the positions associated with one or more of the betting lines disclosed herein, a price/level determination module 86 that is operable to establish, compute, or otherwise determine a price or value for the one or more of the betting lines disclosed herein, and bet settler module 88, operable to settle one or more bets, each of the modules generally for providing end user 12 with wagering opportunities thereon.

Betting instruments 90 are generally data elements derived from or that evidence a wager that is made with respect to the outcome of one or more events associated with a financial or other market. Accordingly, the betting instrument 90 may be a file or a database entry that includes information reflecting bets placed in system 10, which instrument 90 may include parameters relevant to the particular event that forms the basis of the wager. The events might involve the movement or the value of a financial market index, security, or other instrument during or at the end of a predetermined period of time, as described above. Such instruments 90 may include all relevant financial data and obligation terms associated therewith, such as, where applicable, the participant's identification information, account information, the amount of the wager, the market line level, the high line level, the low line level, spread line levels, up and down odds for each line, the time the bet is placed, the betting session the bet was placed in, the opening time, the expiration time, a bet identification number, the status of the bet, e.g., approved (manually or automatically), pending, expired, win, loss, etc., or a combination thereof. The memory element 44 may also include one or more templates and/or tables 94 for use in generating betting sessions as discussed in greater detail below.

In operation, in one embodiment, the movement of a financial market may be graphically represented on an electronic screen using symbols or graphic objects, such as color-coded, e.g., red, green, or yellow, arrows. Each symbol may indicate whether the value of the associated financial market indicator, e.g., the reference variable, was: 1) down during the last predetermined period of time, e.g., the last betting session, or after the last relevant transaction or transactions in the market for the object, shown, e.g., as a red down arrow or simply in an appropriately colored graphic or textual object; 2) up during the last predetermined period of time or after the last relevant transaction or transactions shown, e.g., as a green up arrow or appropriately colored graphic or textual object; or 3) unchanged during the last predetermined period of time or after the last relevant transaction or transactions, e.g., yellow horizontal arrow or simply by leaving the graphic or textual object in an original color. Any suitable number and combination of symbols could represent a suitable portion of the history of, or the movement in, the value of the reference variable. For example, the color of the market line, the typeface of displayed value, a text box around the displayed value, etc., may be a first color, e.g., blue, indicating upward movement in the value of the object. Similarly, the color of the market line, typeface, textbox, etc., may be a second color, e.g., red, indicating downward movement in the value of the object. The direction of the movement may be derived from information that would, for example, indicate that the object is under-bought or under-sold.

Memory element 44 of central controller 40 may store information regarding the various types of different wagers that may be placed and their outcomes in gaming system 10. Memory element 44 may also store various betting instruments 90 and a plurality of end-user profiles 92. Memory element 44 may additionally store information associated with a financial instrument number (FIN), a description of the market(s) that are the subject of the particular wager, a designated duration/expiry, and odds established for the particular wager. These fields, and others, may be defined in numerous ways. For example, the term 'expiry' may refer to a particular closing or settlement time and/or date for betting instrument 90 to close, or it may be based on the events themselves that may be completed at some arbitrary or specific date in the future, e.g., at the closing bell.

Additionally, each end-user profile 92 may include any relevant information associated with end user 12, his wagering activity, biometric data, or his finances. For example, items such as account numbers, transactional history, balances, commissions, available funds, potential debits/credits may be reflected in a profile, a finger print profile, etc. End-user profiles 92 may be pin-accessed by end user 12 or accessed solely by an entity or administrator authorized to do so.

Odds determination module 84 generally determines the odds provided to end user 12 for a particular wager and price determination module 84 determines the betting line values provided to end user 12 for a particular wager. Three factors may generally be considered in setting odds and/or betting line values for betting opportunities: the underlying market or generally the reference level, volatilities, and time. Volatility represents a measure of uncertainty exhibited by the market over a given time period. Markets generally follow log-normal distribution, which reflects an abstraction or theory that allows a person to reasonably approximate market movements. In this sense, the mathematics used to calculate odds/betting line values could be similar to that of options pricing. In other scenarios, odds calculations may be based at least on exposure for an owner/operator of gaming system 10. Note that a number of control parameters are provided to an administrator of gaming system 10. For example, the volatility factor may be manipulated in response to breaking news that would most likely affect market levels. This judgment may be made by an administrator and reflect his own judgment and/or expertise in market theories. In other scenarios, such news items would automatically be priced into the financial market.

In an alternative embodiment, odds determination module 84 determines odds for a particular wager based on the following formula:

$$odds=(prize\ value/risk\ value)*factor.$$

Therefore, odds could be variable based, at least in part, on the prize value and the risk value. In still other embodiments, odds determination module 84 may use or consider any number of influential factors to vary odds for bets that are offered to end users 12. Any number of news items, statistical data, or events, may affect or influence a given market. These factors may be taken into consideration by an administrator in setting odds and/or the betting line values. Such factors may include market news or commentary, job data, interest rate information, commodity prices, consumer spending, consumer confidence, unemployment information, economic growth, capital spending, gross domestic product (GDP) data, bond prices, or any other piece of information or data that may have an influential effect on a given market line. For example, a decrease in interest rates generally spawns an increase in the Dow Jones Industrial Average (DJIA) for that trading day odds determination module 84 may calculate odds in a systematic manner, as described herein, and then factor in this information such that the odds are generally shifted to accommodate for the probability of gains in that day's market performance. In other embodiments, such information is built into the market line in a manner that is suitable to an administrator and, therefore, such manipulations are unnecessary.

In an example scenario, consider that the S&P 500 rarely performs poorly in an election year in the United States. Only twice in the history of the U.S. stock markets has the S&P 500 provided a negative return for investors during an election year. Thus, during an election year, control parameters may be implemented to reflect the proposition that, over the course of the year, the S&P 500 is most likely to rise. Similarly, markets tend to decline in times of war or during patterns of interest rate increases. In the event of a major war or in the event that such a pattern, of systematic interest rate increases, is identified, an administrator could again manipulate the odds, as he sees fit, e.g., specifying a desired volatility factor, to reflect this probable downward trend.

In still other scenarios, the odds associated with a market may be established based on the current market line in conjunction with the proportion of money bet on that market versus the total amount of money accumulated in the relevant betting pool. Because each set of odds corresponds to a percentage, each participant is also associated with a percentage. In order to form a group of participants for a bet without takeout, gaming system 10 can select participants from the field of participants whose percentages total an amount that corresponds to the odds. The percentage corresponding to the odds is also referred to as a target percentage. For example, for an even money bet, i.e., target percentage of 50%, if the lead participant of a group of participants has 5-2 odds and, therefore, is associated with a percentage of 28%, gaming system 10 may form the group of participants by selecting other participants whose percentages total 22%, such as a participant having 7-2 odds (22%); participants having 4-1 odds (20%) and 50-1 odds (2%); or participants having 7-1 odds (12%) and 9-1 odds (10%). In another example, for a bet having odds of 2-1, i.e., target percentage of 33%, if the lead participant of a group of participants has 6-1 odds and, therefore, is associated with a percentage of 14%, gaming system 10 may form the group of participants by selecting other participants whose percentages total 19%, such as participants having 9-1 odds (10%) and 10-1 odds (9%); participants having 5-1 odds (16%) and 30-1 odds (3%); or a single other participant having 9-2 odds (18%) or 4-1 odds (20%).

As the number of participants in an event and the odds for particular participants in an event vary, it may be difficult to assemble a group of participants with a total percentage of exactly the target percentage. Therefore, an administrator of gaming system 10 may attempt to form a group of participants having a total percentage as close to the target percentage as possible. In a particular embodiment, gaming system 10, e.g., via odds determination module 84, may establish a percentage threshold to be used to determine whether odds bets may be offered for a particular event. For example, gaming system 10 may establish a threshold that is three percentage points above or below the target percentage. In this example, gaming system 10 offers an odds bet if the total percentage for the group of participants is within three percentage points above or below the target percentage. Where no odds bet is established in this scenario, gaming system 10 may convert an odds bet into a straight odds bet for the lead participant. Gaming system 10 may attempt to form the group of participants using any suitable number and combination of participants in the field of end users 12. This aspect may be implemented by disabling certain bid opportunities until system 10 receives contra side wagers to satisfy the threshold levels.

Note that in still other scenarios, the market line may be static or fixed over a given time period, whereby the odds may be varied in order to tempt an end user or to solicit additional betting. For example, if the FTSE shoots up 300 points to a level of 5000 in morning trading, the odds can be varied significantly, e.g., 50/1 or 100/1, in order to entice people to bet that the FTSE will close below the original market line. Other occurrences, involving the appreciation or depreciation of corresponding markets, may be readily appreciated and are, thus, clearly within the scope of the teachings of gaming system 10.

In the example provided above, the original market line, when the FTSE opened, was 4700. Thus, if the FTSE were at a level of 5000, odds would have to be attractive enough to persuade a potential bettor to engage in a wagering opportunity involving a significant decline in the FTSE. Thus, long odds prices can be generated in order to lure punters, i.e., bettors, to bet. Market odds could be refreshed several times per day in order to provide new betting opportunities.

The pricing for the static odds embodiment may be computed based at least on relationship illustrated by the following algorithms:

$$C(\tau) = e^{-r\tau} N(d_2)$$

$$P(\tau) = e^{-r\tau}\{1 - N(d_2)\}$$

$$d_2(K, \sigma) = \frac{\ln(S/K) + \left(r - \frac{\sigma^2}{2}\right)\tau}{\sigma\sqrt{\tau}}$$

$$\tau \equiv \frac{T-t}{365}$$

where $C(\tau)$ is the Call binary price, the 'up bet', today
where $P(\tau)$ is the Put binary price, the 'down bet', today
where $\sigma \equiv \sigma(\text{type})$ is the volatility as a function of the bet type; type={Hi,Mid,Lo}
where $d_2$ (K, $\sigma$) is the $d_2$ factor used in the equation and is a function of strike and volatility, in this model.
where r is the associated interest rate
where $\tau$ is the annualized time to expiry
where T is the expiry date; the number of days since the start of the year[1]
where t is the current date; the number of days today since the start of the year
where S is the underlying mid price
where K is the associated strike price for the bet type i.e. $K_{Hi}, K_{Mid}, K_{Lo}$
where $N(\cdot)$ is the cumulative Normal Distribution The odds for the static line embodiment may be computed with at least the relationship illustrated by following algorithms:

$$V_{Hi}^+(T) = \begin{cases} 100: S > K_{Hi} \\ 50: S = K_{Hi} \\ 0: S < K_{Hi} \end{cases}$$

$$V_{Hi}^+(t) = \max\{C(S, K_{Hi}, \sigma_{Hi}, \tau)[1 + \%_{spread}] + 1.5, 3\}$$

$$FO_{Hi}^+(t) = FOConv(V_{Hi}^+(t))$$

$$V_{Hi}^-(T) = \begin{cases} 100: S < K_{Hi} \\ 50: S = K_{Hi} \\ 0: S > K_{Hi} \end{cases}$$

$$V_{Hi}^-(t) = \max\{P(S, K_{Hi}, \sigma_{Hi}, \tau)[1 + \%_{spread}] + 1.5, 3\}$$

$$FO_{Hi}^-(t) = FOConv(V_{Hi}^-(t))$$

The odds for the mid and low line up and down bets may be computed based on a similar formula. The price for the even odds embodiment may be computed based at least on the relationship illustrated in the following algorithm:

$$K_{implied} = g(S, \sigma, \tau, \gamma, V, \text{type})$$

where $K_{implied}$ is the implied strike,
where $g(\cdot)$ is the numerically inverted function,
where $\sigma$ is the volatility,
where $\tau$ is the annualized time to expiry,
where $\gamma$ is the tolerance level,
where V is the binary price,
where type is the type of option, type=(1,0)≡(call, put)

Odds determination module 84 may be employed in order to determine odds for this configuration. Additionally, administrator module 50 may also participate in such a process in order to establish appropriate odds or to refresh the gaming environment to offer new betting opportunities. In other scenarios, any suitable element within gaming system 10 may be implemented to achieve a static or moving market line arrangement, inclusive of the ability to vary odds that are used to entice bettors.

Figure 4A:
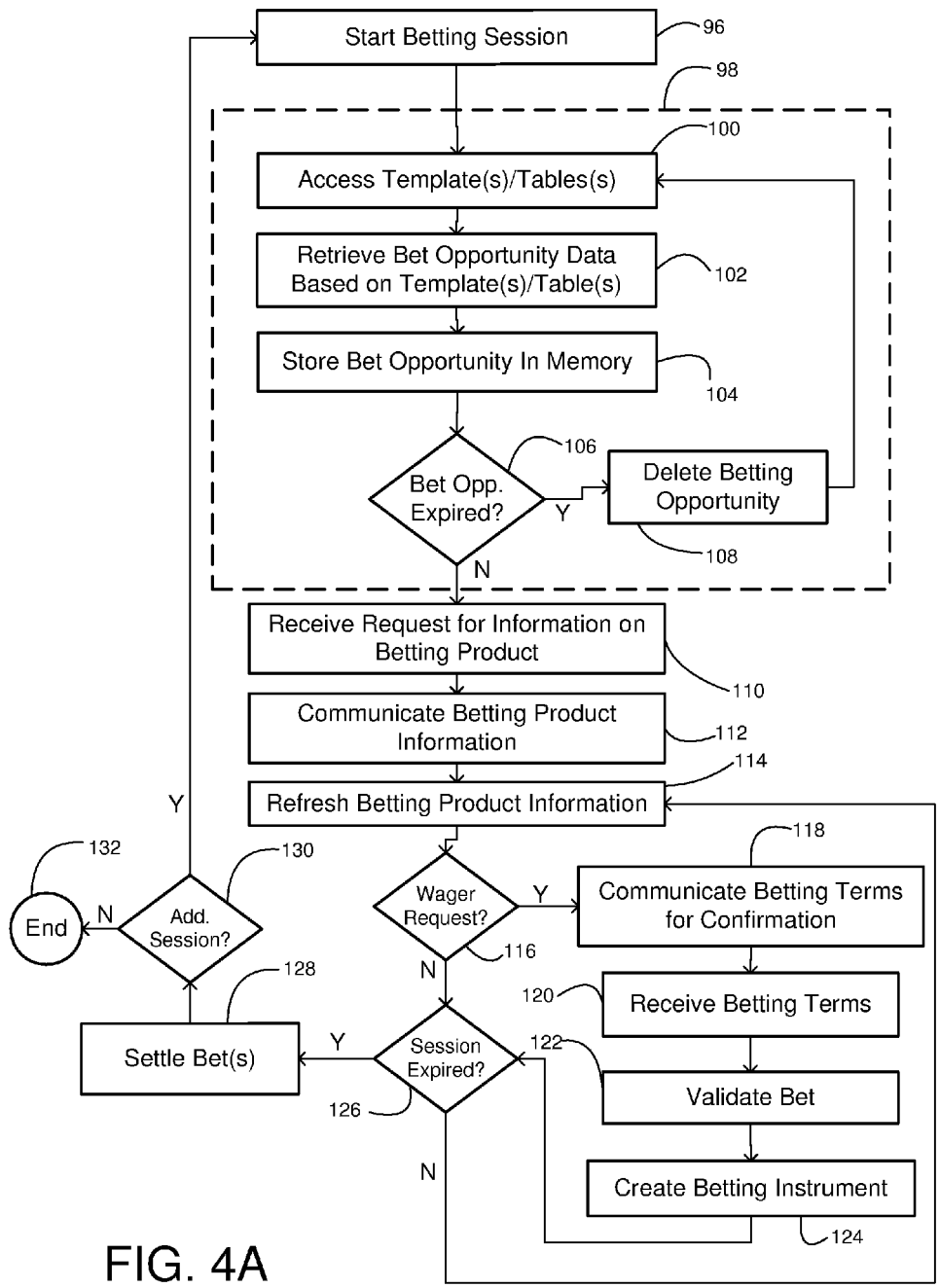
FIG. 4A is a flowchart illustrating a method for wagering in a market environment in accordance with at least one embodiment of the methods disclosed herein.

FIG. 4A is a flowchart illustrating a series of one or more steps associated with a method for wagering in a financial or other market environment. The method may begin by starting a first betting session, at 96. The betting session may be started at any time, as discussed above. For example, a first betting session may be started at the opening of the market on the trading day. For intraday sessions, subsequent betting sessions may be started essentially immediately following the expiration of a previous betting session.

In one embodiment, system 10 creates a betting product, at 98. A betting product may be created in a variety of ways. The betting product may also be created at any time, such as before or at the start time of the betting session. For example, system 10 may provide users with a betting product associated with graphic element 576a, which allows users to place a bet that the particular betting session will close with a market price for the Dow above the opening market price 581 of 11192.8 with 10/11 odds, as shown in FIG. 5. In this respect, a betting product may a persistent record in a database or file that includes therein the relevant data evincing the betting product, such as the market price at the opening of the betting session, the odds for the particular betting opportunity, the expiration time, a product identification number, etc. In this instance, system 10 may retrieve betting product data from the database and communicate a betting product to the end user 12 based thereon for display. The database may then be updated to include therein data on betting products for subsequent betting sessions.

System 10 may also create a less persistent betting opportunity. That is, system 10 may receive relevant betting data for the betting opportunity, e.g., from financial market data element 60, and maintain that data in memory temporarily, such as in a system cache, for sufficient time to provide betting opportunities to end users. In one embodiment, this is accomplished by accessing one or more templates, at 100, retrieving bet data based on the one or more templates, at 102, and storing information representing the betting opportunity in memory, at 104. System 10 may delete and/or create additional betting opportunities from the memory, at 108, when the betting opportunities have expired, at 106, either because the session has expired or because of movement in the underlying market, immediately or any time thereafter. In this respect, system 10 does not necessarily need to store each betting opportunity persistently in a database or file.

Various types and numbers of templates may be implemented for retrieving bet data and providing betting opportunities based thereon. In one embodiment, system 10 accesses at least one template, such as a product template, that includes therein at least one field for each term of the betting product, such as an object code, e.g., FTSE, Dow, etc., a session type, e.g., hourly, daily, etc., a start time, an end time, etc. System 10 may then access the at least one template and at least one table that stores the desired betting data, and generate betting products based thereon. For example, with regard to the betting product associated with graphic element 576a of FIG. 5, system 10 may access a template that includes fields for the object, market price, up odds, and session length, and retrieve from at least one data source: DOW, 11198.8, 10/11, and 5 minutes, respectively.

System 10 may also use a plurality of templates and/or tables, such as a products table, which provides the object code, and a session table, which provides the time period for the particular session type. For example, there may be a products table that includes a row for the FTSE and a row for the Dow and a session table that includes rows for daily and weekly sessions with 60-minute and 7-day periods associated therewith, respectively. System 10 may execute software that applies the template to each of the objects in the products table and in the template table and create therewith a betting opportunity for each of the objects, including a FTSE daily and weekly betting opportunity and a Dow daily and weekly betting opportunity.

System 10 may generate products on any number of objects for any session length. Thus, to have a Daily FTSE, Daily Vodafone, Daily BT, Weekly FTSE, Weekly Vodafone, Weekly BT, Hourly FTSE, Hourly Vodafone, and Hourly BT, three objects may be stored in the products table, i.e., FTSE, Vodafone, and BT, and three time periods stored in the session table, i.e., Daily, Weekly, and, Hourly. The two generic tables may then be used by the product template to create a (3×3) number of products that may last for a limited time, rather than, e.g., 780 daily products, 156 weekly products, 7,020 hourly products, etc. Many different types of templates can be created. Each template can control many products and each product can be controlled by many templates. For example, a template may exist for each type of betting session, which is used to read the objects in the products table and to create a betting opportunity for each object in the table. The number of betting products created may in this instance may be characterized as M*N, where M is the number of objects listed in the products table and N is the number of different types of sessions.

For moving market lines, the betting product may be created again to replace products expired as a result of movement in the value of the underlying object. Thus, a session may have a plurality of betting products created consecutively therein to reflect, e.g., real-time, changes in the value of the object. In this instance, the start time for the betting product may signal the end of a betting product starting prior in time for the same object.

At some time during the betting session, a participant may request information on at least one betting product, at 110. The request may be submitted via an interface screen, such as the interface screen shown in FIG. 2, which includes therein at least one element or link that may be selected for requesting information on at least one particular betting product. For example, the interface screen may include links for displaying betting products associated with an object, such as index, e.g., the Dow, NASDAQ, FTSE, currencies, e.g., Euro vs. USD, etc.

In response to the request, system 10 may communicate to the participant information relevant to the request, at 112. The information may be communicated to the participant in a variety of forms, such as in an electronic file, such as an HTML or XML document, which may support the display of a Flash file or other image files. The communication may cause an interface screen to be displayed at the user interface 16 with the relevant information therein, such as the interface screens shown in FIGS. 2, and 5-11. The information communicated to the participant may be determined in a number of ways. For example, betting product information, such as the market price or any other value associated with an object, may be retrieved from a database or from a streaming source of market data for the object. For other types of information, system 10 may determine the relevant betting product information, such as high levels, low levels, spread levels, and odds for up and down positions for each level, etc., as discussed above, by computing these types of information.

In one embodiment, betting product information is refreshed or republished at least once or preferably periodically within the betting session, at 114. The information may be republished periodically, for example, to reflect movement in the market value of the object, real-time or otherwise, to eliminate or disable bet graphics thereby disabling certain betting opportunities, to change color of graphics to indicate the direction of movement in the market, etc. Product information may be updated using Flash Media Server software that updates the information and media components accordingly. As noted above, refreshing the betting product information may signal the end of a betting product within the betting session and the creation of a subsequent betting product within the same session on the same product. The information is preferably refreshed automatically without participant intervention.

At 116, system 10 listens for a bet request from at least one participant. The participant may submit a bet request in a number of ways. In one embodiment, participants submit bet requests by selecting a graphic associated with at least one betting level or line. The bet request may also include the amount of the wager.

After receipt of the bet request, preferably in response thereto, system 10 may communicate at least one term of the wager to the participant for confirmation, at 118. The terms included may be at least one of: the participant's identification information, account information, the amount of the wager, the market line level, the high line level, the low line level, spread line levels, up and down odds for each line, the time the bet is placed, the betting session the bet was placed in, a duration for the betting session, the opening time of the betting session, the expiration time of the betting session, a bet identification number, etc. The terms of the request preferably reflect the particular selected betting product. For example, the terms for a static odds wager on the market price of the object may include the static odds for the particular selected position, e.g., the up or down position, and the market price at the time the bet request is being submitted. Similarly, for a moving odds wager on the market price of the object, the terms may include the odds for the selected position determined at the time that the bet request is being submitted and the market price at the beginning of the session. The terms may be communicated in an interface screen with at least one selectable element therein for confirming the wager and/or at least one element, such as a field, for the participant to modify one or more terms, such as the amount of the wager.

Confirmed bet requests are generally received at 120 and validated at 122. Validation may include one or a plurality of steps. Validation for example, may entail determining whether the selected betting product exists, is active, and is tradeable. Validation may also entail ensuring that the wager's expiration has not occurred in the past and that the odds or the value terms of the bet request do not differ significantly from those communicated to the participant, e.g., by 50%, or that the wager is non-zero and between any minimum and maximum bounds.

At 124, a betting instrument 90 may then be created to include therein one or more of the terms of the bet that the instrument represents, as discussed above. The betting instrument 90 is generally a persistent record, e.g., in a table, database, or within a resilient cache, that is stored at least until the settlement of the bet.

At 126, a determination is made as to whether the betting session has expired. If, at 126, the betting session has not expired, system 10 refreshes the betting product information, at 114, and continues to do so while listening for a bet request. If system 10 determines, at 116, that the betting session has expired, system 10 proceeds to settle bets, at 128, and either start a subsequent session or end the process for the trading day, at 132, if, at 120, there are no additional sessions to be started for the particular trading day. Settlement may begin immediately following the expiration of the betting session and concurrently with the running of the next betting session, e.g., via a debit or credit to an end-user account, or prolonged in cases where end user 12 has been extended some amount of credit. In other cases, where the relationship between end user 12 and an administrator permits, payments could be simply mailed or communicated electronically by the betting provider in the case of a win or by end user 12 where a loss was incurred. The biometric data may also be used to confirm payout or debit from an authorized account user.

Settlement may be achieved in any number of ways and based on particular needs. A given end user 12 may have a number of bets active at any given time. For example, end user 12 may be betting on an overall rise in the NASDAQ market, having a daily expiry, as well as a reduction (short position) in the German DAX (having a five-minute expiry). Accordingly, the method of FIG. 4A may be repeated for each session, object, betting opportunity, etc., to provide such functionality. Moreover, settlement may occur for a plurality of bets having different expiries at a common time, such as at the last expiry of bets expiring within the same trading day or week, or at the close of the trading day.

Any relevant information may be communicated to end users 12 of gaming system so that the end users may be apprised of the changing value of their betting instruments 90 or of news that may impact their positions. For example, market level data, employment numbers, and/or GDP statistics may be provided to end users 12. Other information provided may simply update the projected value of betting instrument 90 based on current market conditions. An administrator of gaming system 10 may ignore this information or use it to offer new betting opportunities for potential gamers. These opportunities may be readily displayed to end users 12 such that they may participate in even more wagering opportunities through gaming system 10.

Figure 4B:
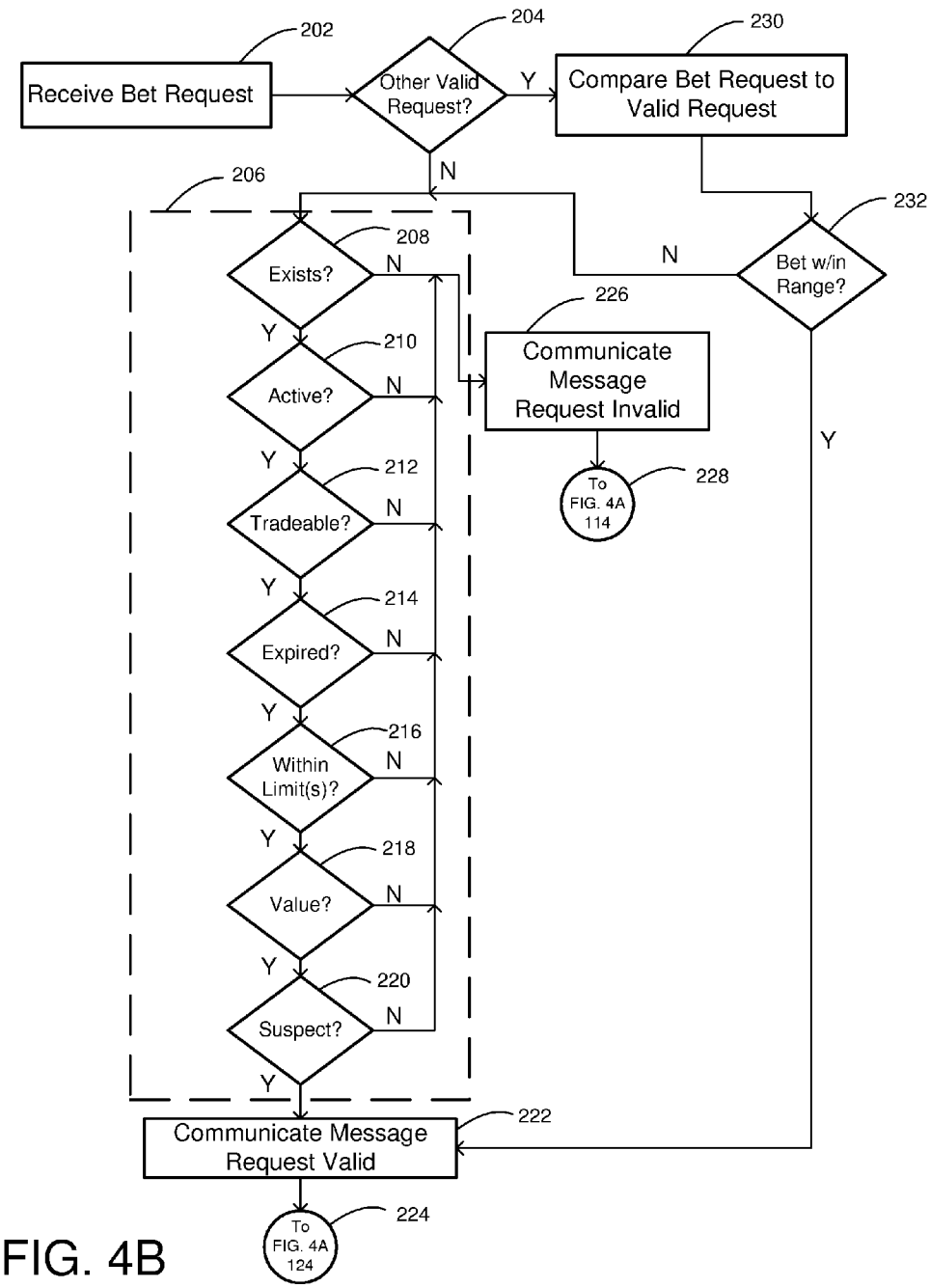
FIG. 4B is a flowchart illustrating a method for validating at least one bet request in accordance with at least one embodiment of the methods disclosed herein.

As noted above, bet requests may be validated in a variety of ways. Referring to FIG. 4B, in one embodiment, validation begins by receiving a bet request, at 202. A determination is made, at 204, whether any other request has been deemed valid, at 204. If there has been no previous validation of a bet request, e.g., within the same betting session, system 10 applies at least one validation test to the bet request, at 206. System 10 may, for example, apply a test for determining whether the betting product exists, at 208, is active, at 210, or is tradeable, at 212. System 10 may also determine whether the session or the bet request itself has expired, at 214, or whether the bet request has at least one term that exceeds a certain limitation, at 216. Any numerical limitation may be applied to the validation process, such as a limit where the system determines whether the wager exceeds the participant's or the provider's wager limit, such as minimum, maximum, and non-zero limits, etc. System 10 may also determine whether the value, e.g., the market price, differs from that communicated to the participant within a certain period of time from receipt of the bet request, at 218. For example, the system may validate a bet request if the betting line value for the bet request is no greater than a certain percentage, e.g., 50%, or any amount from the value communicated to the participant within, e.g., 30 seconds, prior to the bet request. A determination may also be made as to the authority of the user submitting the bet request in doing so, such as based on the biometric data received from the user interface and compared with that stored in the system.

Figure 9:
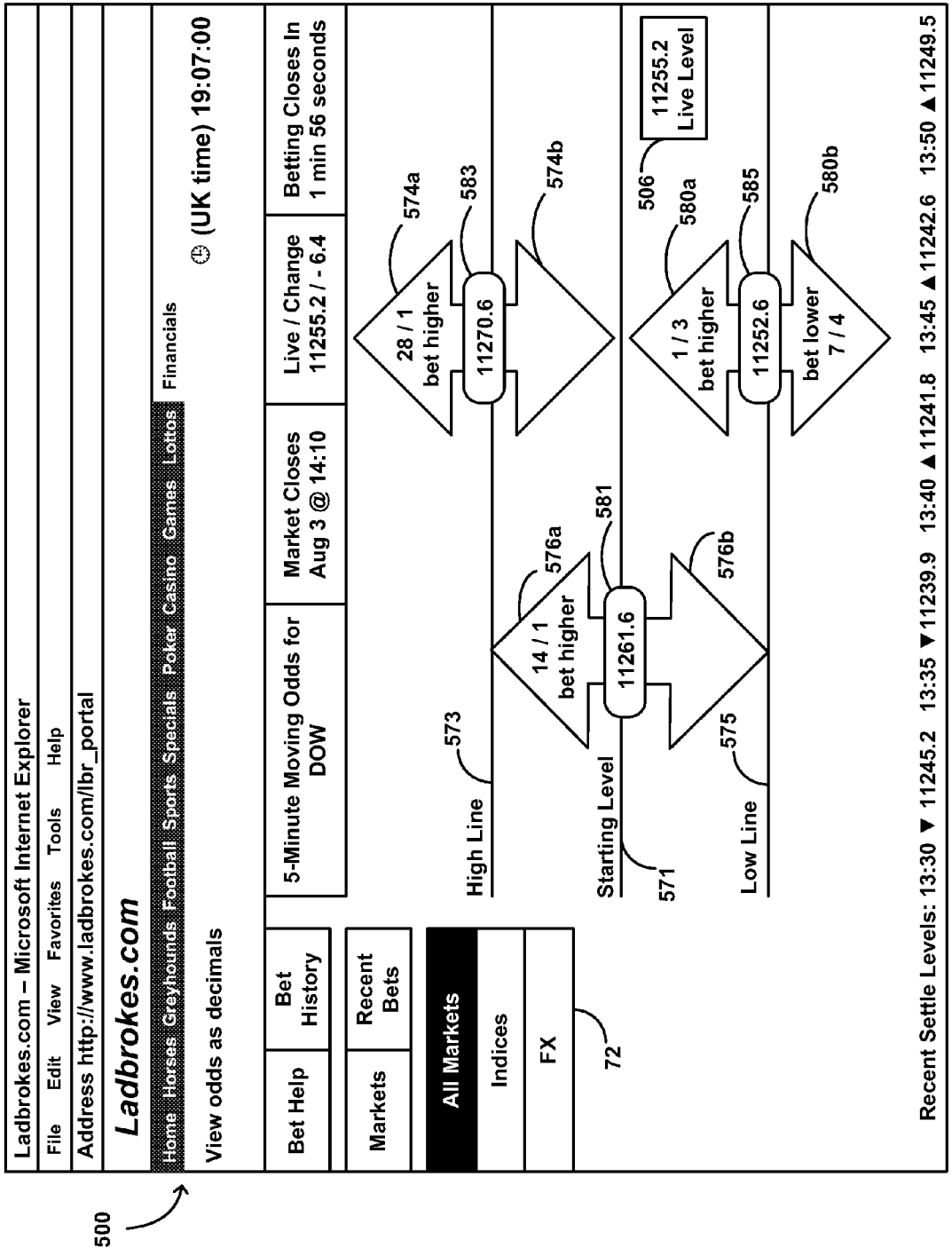

In one embodiment, a determination is made as to the whether the bet request is suspect, at 218. That is, in certain instances, participants may stop incoming data from replacing outdated data previously communicated to the participant. The participant may then attempt to place bets on outdated betting line values and corresponding odds more favorable to the participant than the current betting line values. For example, at time $T_1$ a low line value of 11183.8 for the Dow may be provided to the participant with 6/1 down bet odds, as shown in FIG. 5. At later time $T_2$, as shown in FIG. 9, it can be seen that the market price has moved to 11255.2, below the low line value at $T_1$. A down bet placed on the $T_1$ low line value would therefore be "in the money" at the $T_2$ market price. Accordingly, a determination may be made as to whether the participant is attempting to bet on outdated more favorable betting line values and/or odds. This may be accomplished in a variety of ways. In one embodiment, the system 10 determines if the betting line value or odds of the bet request matches any one of a certain number of those created as of the time of validation. For example, in less volatile markets, the bet request's betting line value or odds may be required to match those of a current betting opportunity. In more volatile markets, the bet request may be required to match at least one of the prior three betting opportunities. Exceptions may be applied if the current market conditions at the time of validation are less favorable to the bet request.

If a determination is made that the bet request is invalid, an appropriate message indicating as such may be communicated to the participant at 226. Similarly, valid requests may trigger a message indicating that the bet has been deemed valid and/or accepted, at 222.

If at 204, another request has been deemed valid, system 10 may compare the bet request with the valid request and determine if at least one of the terms of the bet request fall within a certain range or threshold values of the validated request, at 232. If the bet request is not within range, the bet request may be tested with the default validation test, at 206. If the bet request falls within the range, the bet request may be approved automatically and a message indicating as such may be communicated to the participant, at 222, thereby bypassing the default validation test. Various criteria may be applied in this regard. For example, a bet request may be automatically approved if the time, betting line value, odds, or a combination thereof fall within a certain range of those of a bet request verified manually or otherwise. For instance, a bet request may be automatically verified if the time of the bet request is within 5 seconds and 3 price units (ticks), e.g., between 4503 and 4497 levels, from the betting line value of a bet request verified manually at 4500. It is understood that the time criteria may range anywhere from less than 1 to 30 seconds, of more, depending on the duration of the session. The price criteria may similarly vary anywhere from 1 to 1000 units.

FIGS. 5-8 show interface screens for use in connection with at least one of the moving odds/static line embodiments disclosed herein. Interface screen 500 may include a list 72 with at least one selectable link for a user to display betting opportunities for specific objects, such as an indices link and an FX link. Each of the links may further drill down allowing users to select an index from a plurality of available indices, such as the FTSE, Dow, etc. and to select foreign exchanges from a plurality of available foreign exchanges, such as USD vs. Euro, USD vs. Yen, etc. The system may further provide a plurality of betting opportunities on each object having different session lengths, in which instance, list 72 may also allow the user to drill down to specific session lengths, such as 5-minutes, hourly, daily, weekly, etc.

With a selection of one of the links, the user is generally submitting a request for wagering information on the selected object associated with the link. In response to the selection, the system updates or otherwise causes the interface screen 500 to be displayed to include at least one betting line therein, such as a reference starting level line 571, a high line 573, and a low line 575. Each of the betting lines may have a value associated therewith, e.g., superimposed over the line, such as a market value 581 over the reference starting level line 571, a high line value 583 over the high line 573, and a low line value 585 over the low line 575. Each of the lines and values may have at least one betting opportunity graphic object associated therewith selectable for the user to submit bet requests therewith. For example, the starting level line may have associated therewith an up bet graphic 576a and a down bet graphic 576b. Similarly, high and low lines may have up bet graphics 574a, 580a and down bet graphics 574b, 580b associated therewith. The interface screen 500 includes the odds for each betting opportunity provided, which may be displayed on the selectable graphic of each betting opportunity. Interface screen 500 may also include a live level line 506 that indicates the value of the market at different times in the betting session, such as to reflect real-time changes in the value of the object. The live-level line 506 may move spatially, e.g., vertically, relative to the betting lines displayed.

FIGS. 5-8 are interface screens providing successive betting opportunities on the Dow in a 5-minute betting session ending August 3 at 11:55 A.M. It can be seen that the betting line levels remain the same during the betting session and the odds for each betting opportunity change based at least on the value of the live level lines 506. It can also be seen that the down betting opportunity associated with the high level line 574b of FIG. 5 has been disabled in FIG. 6. As time progresses in the betting session, all of the short position betting opportunity graphics 583b, 580b may be disabled as shown in FIG. 7. Similarly, all of the betting opportunity graphics may be disabled near the close of the session as shown in FIG. 8. FIG. 9 shows an interface screen 500 with the down bet graphics 576b, 583b disabled both for the starting level 571 line and the high level line 573 based on movement in the live level line 506 toward those positions.

FIGS. 10-11 show interface screens for use in connection with at least one of the static odds/moving line embodiments disclosed herein. In response to the selection of one of the links 72, the system updates the interface screen 500 to include at least one betting line therein, such as a current level line 671, a high line 673, a low line 675, and spread lines 677. Each of the betting lines has a value associated therewith superimposed over the line, such as a market value 681 over the starting level line 671, a high line value 683 over the high line 673, a low line value 685 over the low line 675, and spread value 687a, 687b over spread lines 677. Each of the lines and values may have at least one betting opportunity graphic associated therewith selectable for the user to submit bet requests therewith. For example, the reference current level line 671 may have associated therewith an up bet graphic 676a and a down bet graphic 676b. Similarly, high, low, and spread lines may have up bet graphics 674a, 680a, 678a and down bet graphics 674b, 680b, 678b associated therewith. In this instance, Interface screen 500 updates the current level value as well as the over betting line values at different times in the betting session, such as to reflect real-time changes in the value of the object.

FIGS. 10-11 provide successive betting opportunities on the Dow in a 5-minute betting session ending August 3 at 14:25 P.M. It can be seen that the odds for each betting opportunity provided remain static for the betting session and the value of the betting level lines change to reflect movement in the market value of the Dow. It can also be seen that the spread between the high and low lines has narrowed from 15.5 in FIG. 10 to 14.5 in FIG. 6. Upward or downward movement in the underlying market may be displayed on the interface screen. For example, upward movement may be shown in blue, as shown over the low line value 685 in FIG. 11, and downward movement may be shown in red, as shown over the spread line value 687a, 687b in FIG. 11.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A method comprising:
 receiving a request for wagering information; and
 causing a graphic interface screen to be displayed at a user interface, the graphic interface screen comprising:
  a market betting line having a value that corresponds to a market value of an object,
  a high line having a value corresponding to an amount above the market value of the object,
  a low line having a value corresponding to an amount below the market value of the object, each of the market, high, and low lines spatially arranged on the interface screen based at least on the values of each of the lines,
  at least one graphic object associated with each of the betting lines, the at least one graphic object selectable for submitting at least one of:
   an up bet request for wagering on one of the market value, the high line value, and the low line value achieving a level at a later time that is above the one of the market value, the high line value, and the low line value at a first time, and
   a down bet request for wagering on one of the market value, the high line value, and the low line value achieving a level at the later time that is below the one of the market value, the high line value, and the low line value at the first time;
  odds associated with the at least one of the up bet request and the down bet request; and
 refreshing automatically at least one of the market betting line, the high line, the low line, and the odds to reflect movement in the market value of the object.

2. A method comprising:
 receiving a request for wagering information; and
 causing a graphic interface screen to be displayed at a user interface, the graphic interface screen comprising:
  at least one betting line having a value that corresponds to a value of a reference variable associated with an object,
  at least one graphic object selectable for submitting at least one of:
   an up bet request for wagering on the value of the reference variable achieving a level at a later time that is above the value of the reference variable at a first time, and a down bet request for wagering on the value of the reference variable achieving a level at the later time that is below the value of the reference variable at the first time.

3. The method of claim 2, wherein the at least one betting line comprises a market betting line, the value of the reference variable for the market betting line corresponding to a market value for the object, and wherein the at least one graphic object is selectable for submitting at least one of:
an up bet request for wagering on the market value of the object at the later time being above the market value of the object at the first time, and
a down bet request for wagering on the market value of the object at the later time being below that market value of the object at the first time.

4. The method of claim 2, wherein the at least one betting line comprises a high line, the high line value corresponding to an amount above the value of the reference variable, and wherein the at least one graphic object is selectable for submitting at least one of:
an up bet request for wagering on the value of the reference variable at the later time being above the high line value at the first time, and
a down bet request for wagering on the value of the reference variable at the later time being below the high line value at the first time.

5. The method of claim 2, wherein the at least one betting line comprises a low line, the low line value corresponding to an amount below the value of the reference variable, and wherein the at least one graphic object is selectable for submitting at least one of:
an up bet request for wagering on the value of the reference variable at the later time being above the low line value at the first time, and
a down bet request for wagering on the value of the reference variable at the later time being below the low line value at the first time.

6. The method of claim 2, wherein the at least one betting line comprises a plurality of spread lines comprising a first spread betting line having a value that corresponds to an amount above the value of the reference variable and a second spread betting line having a value that corresponds to an amount below the value of the reference variable, and wherein the at least one graphic object is selectable for submitting at least one of:
an up bet request for wagering on the value of the reference variable at the later time being above the first spread betting line value at the first time, and
a down bet request wagering on the value of the reference variable at the later time being below the second spread betting line value at the first time.

7. The method of claim 2,
wherein the interface comprises a plurality of graphic objects comprising:
a first graphic object selectable for submitting an up bet request, and
a second graphic object selectable for submitting a down bet request,
wherein each of the plurality of the graphic objects are displayed on the interface screen spatially relative to the betting line, the method further comprising:
determining odds for at least one of an up bet and a down bet, the graphic interface displaying at least one of the odds for the up bet and the odds for the down bet, wherein the at least one of the odds for the up bet and the odds for the down bet are superimposed on the graphic object.

8. The method of claim 2, comprising starting a betting session having a start time and an end time, the value of the reference variable at the later time determined at the end time of the session, wherein the object comprises at least one of a security and an index.

9. The method of claim 8, wherein the betting session has at least one of a five-minute expiration, a half-hour expiration, an hour expiration, and a day expiration.

10. The method of claim 9, wherein a trading day for receiving bet requests comprises a plurality of betting sessions each having an intraday expiration, wherein at least one of the plurality of the betting sessions starts essentially immediately after expiration of another of the plurality of the betting sessions, further comprising:
settling bets received in a first betting session concurrently with the running of a second betting session.

11. The method of claim 8, wherein the betting line has a static value that remains unchanged for the betting session, the value of the reference variable at the first time set to the value of the reference variable at the start time of the betting session, the method comprising determining odds for at least one of an up bet and a down bet based at least on the value of the reference variable at a time after the first time, further comprising:
receiving a bet request having odds determined at the time of the bet request.

12. The method of claim 11, wherein the graphic interface comprises at least one of the odds for the up bet and the odds for the down bet, the method comprising refreshing at least one of the up bet odds and the down bet odds automatically to reflect movement in the value of the reference variable during the betting session.

13. The method of claim 8, comprising determining odds for at least one of the up bet and the down bet, the odds remaining unchanged for the betting session,
in which the interface screen comprising a symbol indicating at least one of an upward and a downward movement in the value of the reference variable.

14. The method of claim 8, wherein the interface screen comprises:
a plurality of betting lines comprising:
a reference betting line having a value corresponding to the value of the reference variable at the first time, and
at least one of:
a high line having a value corresponding to an amount above the value of the reference variable at the first time, and
a low line having a value corresponding to an amount below the value of the reference variable at the first time; and
a plurality of graphic objects selectable for submitting at least one of an up bet request and a down bet request for each of the betting lines, wherein the method comprises:
determining odds for at least one of an up bet and a down bet for each of the betting lines, the odds remaining unchanged for the betting session; and
determining at least one of the high line value and the low line value at a second time to reflect movement in the value of the reference variable at the second time.

15. The method of claim 14, wherein the reference betting line and at least one of the high line and the low line are displayed in the interface screen spatially a first distance from each other at the first time and a second distance from each other at the second time, the first distance and the second distance narrowing based at least on remaining time in the betting session, wherein the at least one of the high line value and the low line value are refreshed to reflect real-time movement in the value of the reference variable during the betting session, further comprising:

receiving a bet request for wagering on the value of the reference variable at the later time being above or below the value of the reference variable at the time of the bet request.

16. The method of claim 8, wherein the interface screen comprises:

a plurality of betting lines comprising:

a reference betting line having a value corresponding to the value of the reference variable at the first time, a first spread betting line having a value corresponding to an amount above the value of the reference variable at the first time, and a second spread betting line having a value corresponding to an amount below the value of the reference variable at the first time; and a plurality of graphic objects selectable for submitting at least one of an up bet request for wagering on the value of the reference variable at the later time being above the first spread betting line value and a down bet request for wagering on the value of the reference variable at the later time being below the second spread betting line value, wherein the method comprises:

determining odds for at least one of an up bet and a down bet for each of the betting lines, the odds remaining even for the betting session; and determining at least one of the first spread betting line value and the second spread betting line value at a second time to reflect movement in the value of the reference variable at the second time, wherein the reference variable corresponds to a market price of the object.

17. The method of claim 2, comprising:
receiving at least one bet request;
verifying the at least one bet request;
storing a betting instrument comprising information reflecting the verified bet request; and
settling the verified at least one bet request.

18. The method of claim 17, wherein the betting instrument comprises an amount of a wager, a betting position, the value of the reference variable, and odds for the wager.

19. The method of claim 18, wherein the betting instrument is created for a wager in a betting session, the betting instrument comprising at least one of a time the wager is placed, an opening time for the betting session, a duration for the betting session, and an expiration time for a betting session.

20. An apparatus, comprising:
at least one processor; and
at least one memory having instructions stored thereon which, when executed by the at least one processor, direct the at least one processor to:
receive a request for wagering information; and
cause the graphic interface screen to be displayed at a user interface, the graphic interface screen comprising:
at least one betting line having a value that corresponds to a value of a reference variable associated with an object,
at least one graphic object selectable for submitting at least one of:
an up bet request for wagering on the value of the reference variable achieving a level at a later time that is above the value of the reference variable at a first time, and
a down bet request for wagering on the value of the reference variable achieving a level at the later time that is below the value of the reference variable at the first time.

* * * * *